(12) United States Patent
Takayama et al.

(10) Patent No.: US 6,212,630 B1
(45) Date of Patent: Apr. 3, 2001

(54) MICROPROCESSOR FOR OVERLAPPING STACK FRAME ALLOCATION WITH SAVING OF SUBROUTINE DATA INTO STACK AREA

(75) Inventors: Shuichi Takayama, Takarazuka; Tetsuya Tanaka, Ibaraki, both of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/208,200

(22) Filed: Dec. 9, 1998

(30) Foreign Application Priority Data

Dec. 10, 1997 (JP) ...................................... 9-339669

(51) Int. Cl.⁷ ................. G06F 9/40; G06F 9/45
(52) U.S. Cl. ............................... 712/242; 717/5
(58) Field of Search .................. 712/242; 717/5

(56) References Cited

U.S. PATENT DOCUMENTS

| | | |
|---|---|---|
| 5,274,820 | 12/1993 | Gillet . |
| 5,321,823 | 6/1994 | Grundmann et al. . |
| 5,375,242 | 12/1994 | Kumar et al. . |
| 5,450,585 | 9/1995 | Johnson . |
| 5,488,730 | 1/1996 | Brown, III et al. . |
| 5,544,307 | 8/1996 | Maemura . |
| 5,758,162 | 5/1998 | Takayama et al. . |

OTHER PUBLICATIONS

"A Survey of Branch Techniques in Pipelined Processors," by A. Gonzáles, 8205 Microprocessing and Microprogramming, 36 (1993) Oct., No. 5.

Prophetic Branches: A Branch Architecture for Code Compaction and Efficient Execution, by A. Srivastava et al., 1993 Symposium.

"Register Allocation for Data Flow Graphs with Conditional Branches and Loops," by C. Park et al.m European Design Automation Conference 1993.

"Inside Intel's i960CA Superscalar Processor," by S. McGeady, 2407 Microprocessors and Microsystems, 14 (1990) Jul./Aug., No. 6.

Digital, *VAX–11/780 Architecture Handbook*, Digital Equipment Corporation, 1977, pp. 1–2, 2–2, 2–7, 2–11, 3–4 through 3–8, and 8–18 through 8–24.*

* cited by examiner

Primary Examiner—Richard L. Ellis
(74) Attorney, Agent, or Firm—Price and Gess

(57) ABSTRACT

When a subroutine call instruction is transferred from the instruction memory 39 to the IDB 29 and decoded by the decoder 18, the following operations (1)–(3) are executed in parallel: (1) a return address storage operation for incrementing the value stored in the PC 15 using the INC 16 and for storing the incremented value in the LR 13 as a return address; (2) a branch operation for storing the entry address of the subroutine included in the subroutine call instruction in the PC 15; and (3) a stack reserve operation for preparing for the following use of a stack area by adding a value "−4" to the value stored in the SP 12 using the adder 22 and for storing the addition result in the SP 12.

48 Claims, 36 Drawing Sheets

FIG. 1

PRIOR ART

| | | |
|---|---|---|
| call | f | ←3301 |
| ⋮ | | ←3317 |
| sub | 4, SP | ←3302 |
| st | R2 | ←3303 |
| sub | 4, SP | ←3304 |
| st | R3 | ←3305 |
| sub | 4, SP | ←3306 |
| st | LR | ←3307 |
| sub | 8, SP | ←3308 |
| ⋮ | | |
| add | 8, SP | ←3309 |
| ld | LR | ←3310 |
| add | 4, SP | ←3311 |
| ld | R3 | ←3312 |
| add | 4, SP | ←3313 |
| ld | R2 | ←3314 |
| add | 4, SP | ←3315 |
| rts | | ←3316 |

PRIOR ART  FIG. 2

| INSTRUCTION | FORMAT | OPERATION |
|---|---|---|
| SUBROUTINE CALL INSTRUCTION | call label | PC+4→LR<br>label→PC |
| SUBROUTINE RETURN INSTRUCTION | rts | LR→PC |
| STORE INSTRUCTION | st Rn,Mem | Rn→Mem<br>$\left(\begin{array}{c}\text{WHEN Mem IS NOT USED}\\ \text{Rn}\to\text{(SP)}\end{array}\right)$ |
| LOAD INSTRUCTION | ld Mem,Rn | Mem→Rn<br>$\left(\begin{array}{c}\text{WHEN Mem IS NOT USED}\\ \text{(SP)}\to\text{Rn}\end{array}\right)$ |
| ADDOTION INSTRUCTION | add op1,op2 | op2+op1→op2 |
| SUBTRACTION INSTRUCTION | sub op1,op2 | op2−op1→op2 |

PRIOR ART    FIG. 3
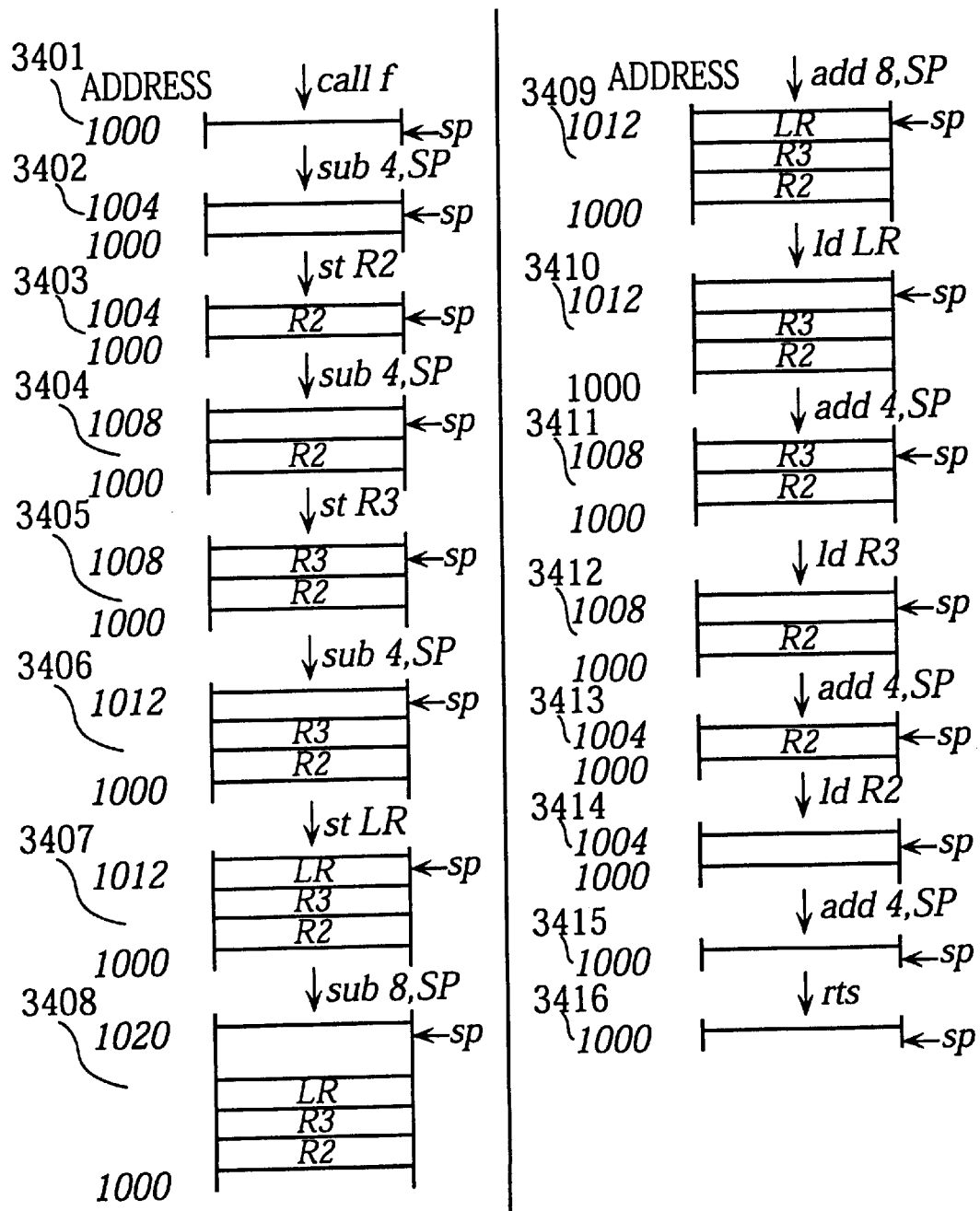

FIG. 6

| INSTRUCTION | FORMAT | OPERATION (PARALLELISM) |
|---|---|---|
| SUBROUTINE CALL STACK RESERVE INSTRUCTION | call—label | PC+4→LR<br>label→PC<br>SP−4→SP |
| SUBROUTINE RETURN STACK RELEASE INSTRUCTION | rts+ | LR→PC<br>SP+4→SP |
| MULTIPLE REGISTER STORE INSTRUCTION | stm [R0,⋯,Rn] | R0→(SP)<br>SP−4→SP<br>R1→(SP)<br>SP−4→SP<br>⋮<br>Rn-1→(SP)<br>SP−4→SP<br>Rn→(SP) |
| MULTIPLE REGISTER STORE STACK RESERVE INSTRUCTION | stm− [R0,⋯,Rn] | R0→(SP)<br>SP−4→SP<br>R1→(SP)<br>SP−4→SP<br>⋮<br>Rn-1→(SP)<br>SP−4→SP<br>Rn→(SP)<br>SP−4→SP |
| RETURN REGISTER STORE INSTRUCTION | st LR | LR→(SP) |
| RETURN REGISTER STORE STACK RESERVE INSTRUCTION | st− LR | LR→(SP)<br>SP−4→SP |

FIG. 7

| INSTRUCTION | FORMAT | OPERATION (PARALLELISM) |
|---|---|---|
| MULTIPLE REGISTER LOAD INSTRUCTION | ldm [R0,···,Rn] | (SP) →Rn ⏋<br>SP+4→SP ⏌<br>(SP) →Rn-1 ⏋<br>SP+4→SP ⏌<br>⋮<br>(SP) →R1 ⏋<br>SP+4→SP ⏌<br>(SP) →R0 ⏋ |
| MULTIPLE REGISTER LOAD STACK RELEASE INSTRUCTION | ldm+ | (SP) →Rn ⏋<br>SP+4→SP ⏌<br>(SP) →Rn-1 ⏋<br>SP+4→SP ⏌<br>⋮<br>(SP) →R1 ⏋<br>SP+4→SP ⏌<br>(SP) →R0 ⏋<br>SP+4→SP ⏌ |
| MULTIPLE REGISTER LOAD INSTRUCTION | ld LR | (SP)→LR ⏋ |
| MULTIPLE REGISTER LOAD STACK RELEASE INSTRUCTION | ld+LR | (SP)→LR ⏋<br>SP+4→SP ⏌ |

FIG. 10

```
int      i0, i1, i2, i3, j;

main ()
{
         f ();
} f ()
{
         int  10, 11, 12, 13;

```
main:
         call—  f              ←121
f:
         stm—   [R2, R3]       ←122
         st     LR             ←123
         sub    16, SP         ←124 ld     (i0), R0       ←┐—125
         st     R0, (SP)        │
         ld     (i1), R0        │
         st     R0, (4, SP)     │
         ld     (i2), R0        │
         st     R0, (8, SP)     │
         ld     (i3), R0        │
         st     R0, (12, SP)    │
                                │
         ld     (SP), R0        │
         ld     (4, SP), R1     │
         ld     (8, SP), R2     │
         ld     (12, SP), R3    │
                                │
         add    R1, R0          │
         add    R2, R0          │
         add    R3, R0          │
         st     R0, (j)         │
                                │
         call—  g              ←┘ add    16, SP         ←126
         ld+    LR             ←127
         ldm    [R2, R3]       ←128
         rts+                  ←129
```

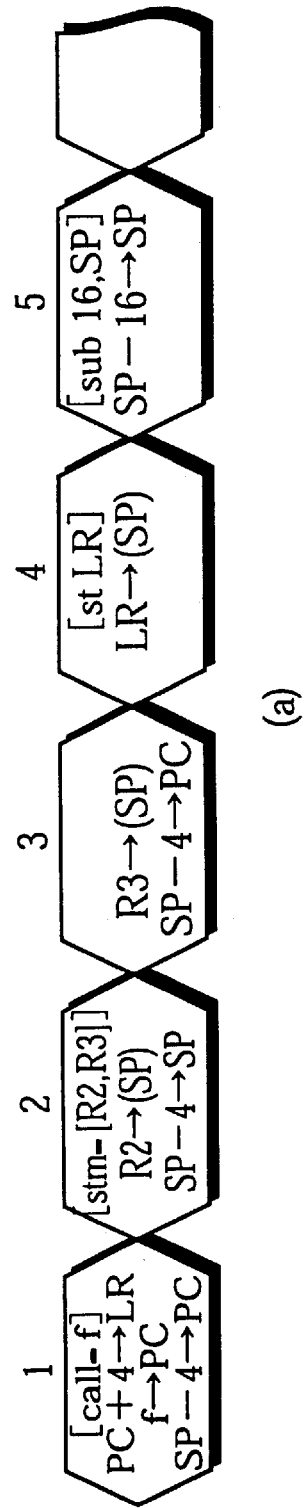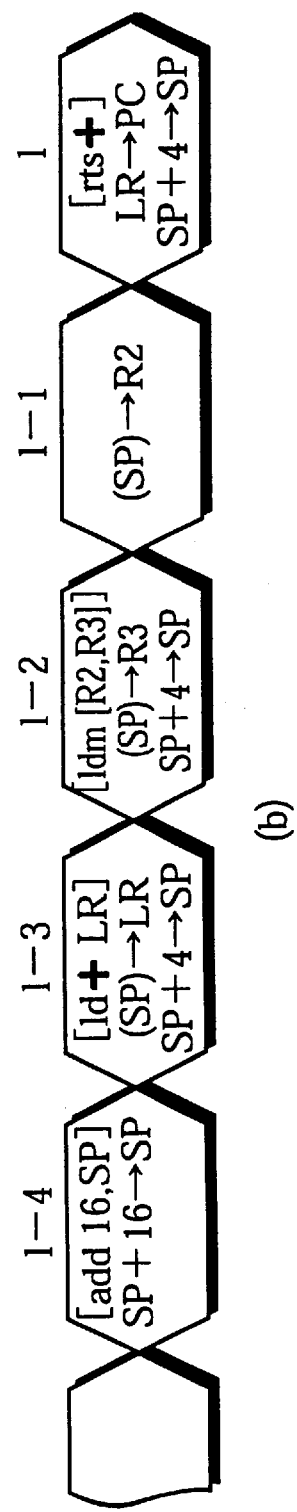
FIG. 13A (a)
FIG. 13B (b)

FIG. 14

```
int      i0, i1, i2, i3, j;

main ()
{
         f ();
} f ()
{
         int  l0, l1, l2, l3;

```
main:
        call—   f
f:
        stm—    [R2, R3]
        sub     16, SP ld      (i0), R0
        st      R0, (SP)
        ld      (i1), R0
        st      R0, (4, SP)
        ld      (i2), R0
        st      R0, (8, SP)
        ld      (i3), R0
        st      R0, (12, SP)

ld      (SP), R0
        ld      (4, SP), R1
        ld      (8, SP), R2
        ld      (12, SP), R3 add     R1, R0
        add     R2, R0
        add     R3, R0
        st      R0, (j)

add     16, SP
        ldm     [R2, R3]
        rts+
```

FIG. 17

```
int     i0, i1, i2, i3, j;

main ()
{
        f ();
} f ()
{
        j=i0+i1+i2+i3;
        g ();
}
```

FIG. 18

```
main:
        call─  f
f:
        stm─   [R2, R3]
        st     LR ld     (i0), R0
        ld     (i1), R1
        ld     (i2), R2
        ld     (i3), R3 add    R1, R0
        add    R2, R0
        add    R3, R0
        st     R0, (j)

call   g ld+    LR
        ldm    [R2, R3]
        rts+
```

FIG. 20

```
int      i0, i1, i2, i3, j;

main()
{
         f();
} f()
{
         j=i0+i1+i2+i3;
}
```

FIG. 21

```
main:
         call—   f
f:
         stm—    [R2, R3]

ld      (i0), R0
         ld      (i1), R1
         ld      (i2), R2
         ld      (i3), R3 add     R1, R0
         add     R2, R0
         add     R3, R0
         st      R0, (j)

ldm     [R2, R3]
         rts+
```

FIG. 23

```
int     i0, i1, j;

main ()
{
        f ();
} f ()
{
        int l0, l1;

```
main:
        call─ f
f:
        sub     4, SP ld      (i0), R0
        st      R0, (SP)
        ld      (i1), R0
        st      R0, (4, SP)

ld      (SP), R0
        ld      (4, SP), R1 add     R1, R0
        st      R0, (j)

add     4, SP
        rts+
```

FIG. 26

```
int     i0, i1, j;

main ()
{
        f ();
} f ()
{
        int  l0, l1;

```
main:
        call    f
f:
        st      LR
        sub     8, SP ld      (i0), R0
        st      R0, (SP)
        ld      (i1), R0
        st      R0, (4, SP)

ld      (SP), R0
        ld      (4, SP), R1 add     R1, R0
        st      R0, (j)

call    g add     8, SP
        ld      LR
        rts
```

FIG. 29

```
main ()
{
        f ();
} f ()
{
        g ();
}
```

FIG. 30

```
main:
        call—  f
f:
        st     LR
        call—  g
        ld     LR
        rts+
```

```
main ()
{
        f () ;
} f ()
{
}
```

```
main:
        call— f
f:
        rts+
```

FIG. 36

```
main:
        call    f            ←221
f:
        st      LR           ←222
        stm     [R2, R3]     ←223
        sub     16, SP       ←224 ld      (i0), R0     ←┐—225
        st      R0, (SP)      │
        ld      (i1), R0      │
        st      R0, (4, SP)   │
        ld      (i2), R0      │
        st      R0, (8, SP)   │
        ld      (i3), R0      │
        st      R0, (12, SP)  │
                              │
        ld      (SP), R0      │
        ld      (4, SP), R1   │
        ld      (8, SP), R2   │
        ld      (12, SP), R3  │
                              │
        add     R1, R0        │
        add     R2, R0        │
        add     R3, R0        │
        st      R0, (j)       │
                              │
        call    g            ←┘ add     16, SP       ←226
        ldm+    [R2, R3]     ←227
        ld      LR           ←228
        rts+                 ←229
```

FIG. 39

```
main:
            call—   f
f:
            st—     LR
            stm     [R2, R3]

ld      (i0), R0
            ld      (i1), R1
            ld      (i2), R2
            ld      (i3), R3 add     R1, R0
            add     R2, R0
            add     R3, R0
            st      R0, (j)

call—   g ldm+    [R2, R3]
            ld      LR
            rts+
```

MICROPROCESSOR FOR OVERLAPPING STACK FRAME ALLOCATION WITH SAVING OF SUBROUTINE DATA INTO STACK AREA

BACKGROUND OF THE INVENTION

1. Field of the Invention

The present invention relates to microprocessors and programming language compilers, and more specifically relates to a technique for performing subroutine calls/returns and register saves/restores associated with the subroutine calls/returns at high speed.

2. Description of the Prior Art

As structured programming, such as C language, comes into wider use, machine instruction sequences executed by microprocessors (hereinafter simply referred to as "processors") include more subroutines. Immediately after a subroutine is called, values in a plurality of registers used by the processor need to be saved into (pushed onto) a stack memory (a stack area in a data memory, hereinafter also simply referred to as "a stack"). When controls return from the subroutine, the saved values need to be restored (popped) into the plurality of registers.

FIG. 1 is a list of machine instructions generated by a conventional programming language compiler (hereinafter simply referred to as "a compiler"). This list includes instructions for calling a subroutine and for returning from the subroutine. FIG. 2 is a table showing operations of the machine instructions in this list. FIG. 3 shows changes in the stack contents, the stack size, and the value of the stack pointer SP, when a conventional processor executes these machine instructions.

Here, the legends "PC", "LR", "Rn", and "SP" respectively refer to the program counter used by the processor, the return register for storing the return address for a subroutine, the nth general register, and the stack pointer. The legend "Mem" refers to an external memory (including a stack) and the legends "op1" and "op2" respectively refer to a source operand and a destination operand. Each row in the operation column in the table shown in FIG. 2 gives operations that can be performed in parallel in one machine cycle (hereinafter simply referred to as "cycle") by the processor (including operations which can be performed at different timings in the same cycle). When executing the subroutine call instruction "call label", for instance, the processor increments the program counter PC by four (and stores the value in the return register LR) and stores the call destination label in the program counter PC in one cycle.

FIG. 1 shows the following operations: the call of the subroutine "f" (step 3301); the reserving of a stack immediately after the subroutine call (steps 3302, 3304, 3306, and 3308); the saving of registers (steps 3303, 3305, and 3307); the release of the stack immediately before the return from the subroutine (steps 3309, 3311, 3313, and 3315); and the restoration of the registers to saved values and the return from the subroutine "f" (step 3316).

Here, the reserving of a stack means that the stack is extended by a necessary amount before the stack is used (a value is stored on the stack). This is achieved by lowering the stack pointer SP. The release of a stack means that the stack is narrowed by the amount of stored data that has been used. This is achieved by raising the stack pointer SP. The saving of registers means that values stored in the registers are saved on a stack. The restoration of registers means that data saved on a stack is read and is restored in the original registers.

It should be noted here that the reserving of a stack can be a process associated with the saving of nondestructive registers (registers whose contents should remain unchanged before and after a subroutine is executed) (steps 3302, 3304, and 3306) or a process for reserving local areas (stack areas for local variables which are valid only in subroutines) (step 3308). Similarly, the release of a stack can be a process for releasing local areas or a process associated with the restoration of nondestructive registers (steps 3311, 3313, and 3315).

FIGS. 4A and 4B are timing charts which show the operation performed by the processor in each cycle in respectively the former half (steps 3301–3308) and the latter half (steps 3309–3316) of the machine instructions shown in FIG. 1. As can be seen from these drawings, conventional techniques require eight cycles to branch to the subroutine "f", to save two nondestructive registers R2 and R3, to save the return register LR, and to reserve the local area in the former half. Similarly, eight cycles are required to release the local area, to restore the return register LR, to restore the nondestructive registers R2 and R3, and to return from the subroutine "f" in the latter half.

In detail, a conventional compiler saves nondestructive registers or reserves a local area by generating a pair of instructions for reserving a stack and saving registers at the starting location of a subroutine, and by generating a pair or instructions for releasing the stack and restoring the registers at the ending location of the subroutine. This is repeated whenever necessary.

However, conventional compilers and processors do not have sufficient performance to satisfy the exacting requirements of recent appliances using processors, such as multi-functioning and high-speed processing. In particular, when a functional programming language, such as C language, is used for developing software for appliances using embedded processors and control devices that require real-time processing, it is very difficult for a conventional compiler and processor to deliver sufficient processing speed.

SUMMARY OF THE INVENTION

In view of the stated problems, it is the object of the present invention to provide a processor which executes processes associated with subroutines at high speed and a compiler for the processor. More specifically, the object of the present invention is to provide a processor which can execute routine operations associated with the branch to a subroutine and the return from the subroutine, such as those shown in FIGS. 4A and 4B, in less cycles and to provide a compiler for the processor.

To achieve the above object, the processor of the present invention which is connected to a data memory providing a stack area and to an instruction memory prestoring instructions, includes: a subroutine call unit for causing a branch to a subroutine in an execution sequence; a stack reserve unit for reserving a new stack area in the data memory; an instruction fetch unit for fetching an instruction from the instruction memory; and a first instruction execution unit for having, when the fetched instruction is a first instruction, the subroutine call unit cause the branch and the stack reserve unit reserve the new stack area in parallel. Also, the compiler of the present invention for converting a source program into machine instructions includes a subroutine call stack reserve instruction generation unit for generating a subroutine call stack reserve instruction when a subroutine call instruction is detected in the source program, where the subroutine call stack reserve instruction is a machine instruction for having a processor perform the following operations (a) and (b) in parallel: (a) a causing of a branch to a subroutine in an execution sequence; and (b) a reserving of a new stack area in a data memory. With the stated constructions, when the processor executes the first instruction, the branch to the subroutine and the reserving of the new stack area are performed in parallel in one cycle. As a result, the execution time necessary for these operations is shortened, in comparison with a conventional technique where these operations are performed sequentially.

Here, the processor may further include: a return address storage unit which includes an area for storing a return address, the return address being a return destination when the execution sequence is returned from the subroutine to a main routine that called the subroutine; and a return address writing unit for writing the return address in the return address storage unit, where when the fetched instruction is the first instruction, the first instruction execution unit has the return address writing unit write the return address in the return address storage unit in parallel with the subroutine call unit causing the branch and the stack reserve unit reserving the new stack area. Also, the subroutine call stack reserve instruction generated by the compiler may be a machine instruction for having the processor further perform the following operation (c) in parallel with the operations (a) and (b): (c) a writing of a return address in a return address storage unit of the processor, the return address being a return destination when the execution sequence is returned from the subroutine to a main routine that called the subroutine. With the stated constructions, when the processor executes the first instruction, the branch to the subroutine, the reserving of the new stack area, and the saving of the return address into the return address storage unit are performed in parallel in one cycle. As a result, the execution time necessary for these operations is shortened, in comparison with a conventional technique where these operations are performed sequentially.

Here, the processor may further include a return address save unit for saving the return address stored in the return address storage unit into the new stack area. Also, the compiler may further include a return address save instruction generation unit for generating a return address save instruction when a subroutine call instruction is detected in the subroutine, where the return address save instruction is a machine instruction for having the processor perform the following operation (d): (d) a saving of the return address stored in the return address storage unit into the new stack area. With the stated constructions, the new stack area is reserved beforehand as a result of the execution of the first instruction by the processor and is used for saving the return address. As a result, when a return address needs to be saved because a branch from a subroutine to another subroutine is caused in the execution sequence, a separate operation for reserving the new stack for saving the return address of the second subroutine becomes unnecessary. This shortens the execution time.

Here, the processor may further include a second instruction execution unit for having, when the fetched instruction is a second instruction, the return address save unit save the return address stored in the return address storage unit into the new stack area and the stack reserve unit reserve another new stack area in parallel. Also, the return address save instruction generated by the compiler may be a machine instruction for having the processor further perform the following operation (e) in parallel with the operation (d): (e) a reserving of another new stack area in the data memory. With the stated constructions, when the processor executes the second instruction, the saving of the return address and the S reserving of another new stack area are performed in parallel in one cycle. As a result, the execution time necessary for these operations is shortened, in comparison with a conventional technique where these operations are performed sequentially.

Here, the processor may further include a return address restoration unit for restoring the return address saved in the new stack area into the return address storage unit. Also, the compiler may further include a return address restoration instruction generation unit for generating a return address restoration instruction when a subroutine call instruction is detected in the subroutine, where the return address restoration instruction is a machine instruction for having the processor perform the following operation (f): (f) a restoration of the return address saved in the new stack area into the return address storage unit. With the stated constructions, the original return address is restored into the return address storage unit. As a result, the situation where the return address is destroyed by a nest structure is avoided.

Here, the processor may further include: a stack release unit for releasing the new stack area in the data memory after the return address restoration unit has restored the return address into the return address storage unit; and a third instruction execution unit for having, when the fetched instruction is a third instruction, the return address restoration unit restore the return address saved in the new stack area into the return address storage unit and the stack release unit release the new stack area in parallel. Also, the return address restoration instruction generated by the compiler may be a machine instruction for having the processor further perform the following operation (g) in parallel with the operation (f): (g) a release of the new stack area in the data memory. With the stated constructions, when the processor executes the third instruction, the restoration of the return address and the release of the new stack area from which data is read are performed in parallel in one cycle. As a result, the execution time necessary for these operations is shortened, in comparison with a conventional technique where these operations are performed sequentially.

Here, the processor may further include: a subroutine return unit for causing a return from the subroutine to the main routine in the execution sequence; a stack release unit for releasing the new stack area in the data memory; and a fourth instruction execution unit for having, when the fetched instruction is a fourth instruction, the subroutine return unit cause the return and the stack release unit release the new stack area in parallel. Also, the compiler may further include: a subroutine return stack release instruction generation unit for generating a subroutine return stack release instruction, where the subroutine return stack release instruction is a machine instruction for having the processor perform the following operations (h) and (i) in parallel: (h) a causing of a return from the subroutine to a main routine that called to the subroutine in the execution sequence; and (i) a release of the new stack area in the data memory. With the stated constructions, when the processor executes the fourth instruction, the return from the subroutine and the release of the new stack area from which data is read are performed in parallel in one cycle. As a result, the execution time necessary for these operations is shortened, in comparison with a conventional technique where these operations are performed sequentially.

Here, the processor may further include a return address storage unit for storing a return address, the return address being a return destination when the execution sequence is returned from the subroutine to a main routine that called the subroutine, where the subroutine return unit has the execution sequence return to a position of the main routine specified by the return address stored in the return address storage unit. Also, the subroutine return stack reserve instruction generated by the compiler may be a machine instruction for causing a return to a position of the main routine specified by a return address stored in a return address storage unit in the execution sequence. The stated constructions achieve a processor and a compiler which correspond to a processor having an architecture for performing a subroutine return by referring to the return address stored in the return address storage unit.

Here, the processor may further include: a data storage unit for storing data to be saved; a data save unit for saving the data stored in the data storage unit into the new stack area; and a fifth instruction execution unit for having the data save unit save the data stored in the data storage unit into the new stack area and the stack reserve unit reserve another new stack area in parallel. Also, the compiler may further include: a data save judging unit for judging whether the processor stores a piece of data which should be saved before a branch to the subroutine is caused in the execution sequence; and a data save stack reserve instruction generation unit for generating a data save stack reserve instruction when a judging result of the data save judging unit is affirmative, where the data save stack reserve instruction is a machine instruction for having the processor perform the following operations (j) and (k) in parallel: (j) a saving of the piece of data judged to be saved into the new stack area; and (k) a reserving of another new stack area in the data memory. With the stated constructions, when the processor executes the fifth instruction, the saving of a register and the reserving of another new stack area are performed in parallel in one cycle. As a result, the execution time necessary for these operations is shortened, in comparison with a conventional technique where these operations are performed sequentially.

Here, the data storage unit of the processor may store a plurality of pieces of data to be saved, and the fifth instruction execution unit may have the data save unit save the data stored in the data storage unit into the new stack area and the stack reserve unit reserve another new stack area in parallel repeatedly for each of the plurality of pieces of data. Also, the data save stack reserve instruction generated by the compiler may be a machine instruction for having the processor repeatedly perform the operations (j) and (k). With the stated constructions, when the processor executes the fifth instruction, the saving of a register and the reserving of another stack area are repeatedly performed in parallel for the number of registers to be saved. As a result, the execution time necessary for these operations is shortened, in comparison with a conventional technique where these operations are performed sequentially.

Here, the processor may further include: a data storage unit which includes an area for storing data; a data restoration unit for restoring data in a stack area in the data memory into the data storage unit; a stack release unit for releasing the stack area that stored the data restored into the data storage unit by the data restoration unit; and a sixth instruction execution unit for having, when the fetched instruction is a sixth instruction, the data restoration unit restore the data in the stack area into the data storage unit and the stack release unit release the stack area that stored the restored data in parallel. Also, the compiler may further include: a data restoration stack release instruction generation unit for generating a data restoration stack release instruction, where the data restoration stack release instruction is a machine instruction for having the processor perform the following operations (l) and (m) in parallel: (l) a restoration of data stored in a stack area in the data memory into a data storage means of the microprocessor; and (m) a release of the stack area that stored the restored data in the data memory. With the stated constructions, when the processor executes the sixth instruction, the restoration of registers and the release of the stack area from which data is read are performed in parallel in one cycle. As a result, the execution time necessary for these operations is shortened, in comparison with a conventional technique where these operations are performed sequentially.

Here, the data storage unit of the processor may include a plurality of storage areas for storing a plurality of pieces of data, and the sixth instruction execution unit may have the data restoration unit restore the data in the stack area into the data storage unit and the stack release unit release the stack area that stored the restored data in parallel repeatedly for each of the plurality of storage areas of the data storage unit. Also, the data restoration stack release instruction generated by the compiler may be a machine instruction for having the processor repeatedly perform the operations (l) and (m). With the stated constructions, when the processor executes the sixth instruction, the restoration of a register and the release of the stack area are repeatedly performed in parallel for the number of registers to be saved. As a result, the execution time necessary for these operations is shortened, in comparison with a conventional technique where these operations are performed sequentially.

Here, the compiler of the present invention may be a computer-readable recording medium which records a program including steps corresponding to the units of the compiler. This is because the compiler can be achieved by a program which is executed by a general computer.

Here, the present invention may be computer-readable recording medium which records machine instructions including the first-sixth instructions. This is because the essence of the present invention lies in the development of effective instructions such as the first-sixth instructions that allow a processor to perform processes associated with the execution of subroutines at high speed.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 is a list of machine instructions generated by a conventional compiler;

FIG. 2 is a table showing operations of the machine instructions shown in FIG. 1;

FIG. 3 shows changes in the stack contents, the stack size, and the value of the stack pointer SP when a conventional processor executes the machine instructions shown in FIG. 1;

FIG. 6 shows some of the machine instructions that are decoded and executed by the processor of the present invention;

FIG. 7 shows other of machine instructions that are decoded and executed by the processor of the present invention;

FIG. 10 is a list of the source program of the first example;

FIG. 11 is a list of the machine program of the first example;

FIGS. 13A and 13B are timing charts showing the operation of the processor of the present invention in each cycle in respectively the former half and the latter half of the machine instructions shown in FIG. 11;

FIG. 14 is a list of the source program of the second example;

FIG. 15 is a list of the machine program of the second example;

FIG. 17 is a list of the source program of the third example;

FIG. 18 is a list of the machine program of the third example;

FIG. 20 is a list of the source program of the fourth example;

FIG. 21 is a list of the machine program of the fourth example;

FIG. 23 is a list of the source program of the fifth example;

FIG. 24 is a list of the machine program of the fifth example;

FIG. 26 is a list of the source program of the sixth example;

FIG. 27 is a list of the machine program of the sixth example;

FIG. 29 is a list of the source program of the seventh example;

FIG. 30 is a list of the machine program of the seventh example;

FIG. 36 is a list of the machine program generated from the source program shown in FIG. 10 by the compiler of the modification;

FIG. 39 is a list of the machine program generated from the source program shown in FIG. 17 by the compiler of the modification.

DESCRIPTION OF THE PREFERRED EMBODIMENT

The embodiment of the processor and compiler of the present invention is described below with reference to the figures.

Processor

Figure 5:
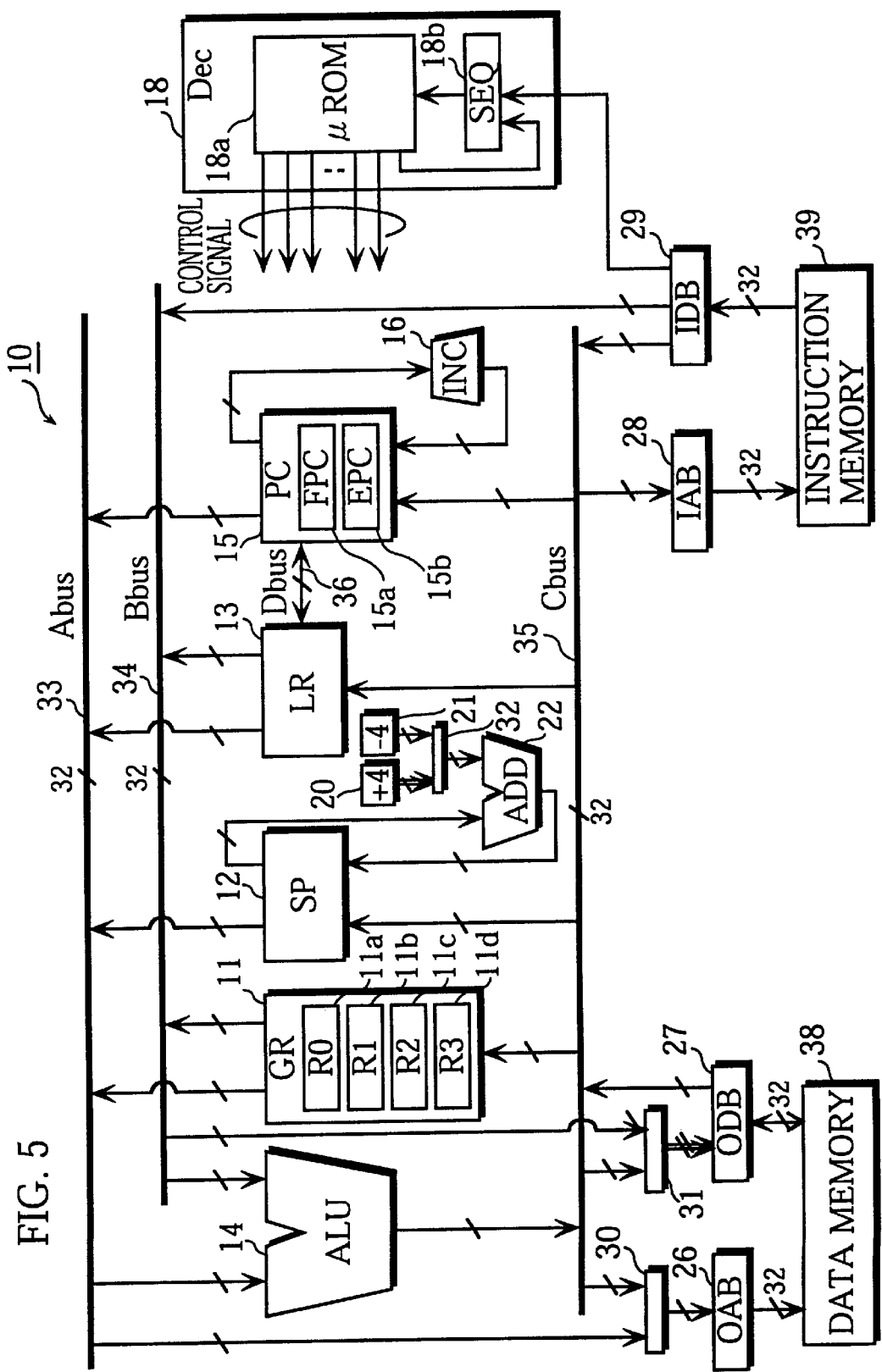
FIG. 5 is a block diagram showing the construction of the processor of the present invention.

FIG. 5 is a block diagram showing the construction of the processor 10 of the embodiment. The processor 10 handles 32 bits (4 bytes) as its basic word length (one word) and is a microprocessor which sequentially executes instructions with a fixed word length of 32 bits. The processor 10 includes the register file (GR) 11, the stack pointer (SP) 12, the return register (LR) 13, the ALU 14, the program counter (PC) 15, the incrementor (INC) 16, the decoder (Dec) 18, the fixed values ("+4" 20, "−4"21), the adder 22, the internal buses (the A bus 33, the B bus 34, the C bus 35, and the D bus 36), the operand address buffer (OAB) 26, the operand data buffer (ODB) 27, the instruction address buffer (IAB) 28, the instruction data buffer (IDB) 29, and the selectors 30–32. Note that these components are controlled by control signals output from the decoder 18 and operate in synchronization with an internal clock (not shown in FIG. 5). The data memory 38 and the instruction memory 39 are external memories connected to the processor 10 and are respectively a storage area for storing temporary data, such as a stack, and a storage area for prestoring machine instructions.

The GR 11 is a group of. four general-purpose registers R0–R3.

The SP 12 is a pointer register giving the address of a stack region to store data or to be referred to next (the address of a stack top) in the data memory 38. The fixed values "+4" 20 and "−4" 21 are 32-bit data (fixed signal patterns) that respectively give the values "+4" and "−4". The selector 32 selects one of the fixed values 20 and 21 and outputs the selected fixed value to the adder 22. The adder 22 adds the value (+4 or −4) output from the selector 32 to the value in the SP 12 and stores the addition result in the SP 12. These components 20–22 and 32 function as a specialized incrementor and decrementor of the SP 12.

The LR 13 is an address register for storing an address of a machine instruction in the instruction memory 39 to which the control should return after a subroutine has been executed (a return address). The ALU 14 is an arithmetic logic operation unit with two inputs and one output.

The PC 15 includes the instruction fetch PC (FPC) 15a which gives the address in the instruction memory 39 of a machine instruction to be fetched next by the IDB 29 and the execution PC (EPC) 15b which gives an address of an instruction that is currently being decoded by the decoder 18 and executed. The INC 16 is an adder to increment the FPC 15a and the EPC 15b by four. It should be noted here that the LR 13 is directly connected to the FPC 15a and the EPC 15b through the D bus 36, so that data can be directly transferred between the LR 13 and the PC 15.

The decoder 18 decodes each machine instruction fetched by the IDB 29 and outputs control signals corresponding to the fetched instruction to each component. The decoder 18 includes the microprogram storage unit (µROM) 18a which stores micro codes (data corresponding to control signals) for each machine instruction that is decoded and executed by the processor 10 and the sequencer (SEQ) 18b which specifies the address of each micro code to be output from the µROM 18 according to the machine instruction sent from the IDB 29.

The selector 30 selects one of data output to the A bus 33 and data output to the C bus 35, and outputs the selected data to the OAB 26. The selector 31 selects one of data output to the B bus 32 and data output to the C bus 35, and outputs the selected data to the ODE 27

The OAB 26 is a buffer for outputting a destination/source operand address for a data (operand data) transfer between the processor 10 and the data memory 3B. The ODB 27 is a buffer for outputting/inputting operand data corresponding to the output address from/to the data memory 38.

The IAB 28 is a buffer for outputting the address of the machine instruction to be fetched by the processor 10 next to the instruction memory 39. The IDB 29 is a buffer for temporarily holding the fetched machine instruction. It should be noted here that the processor 10 has a pipeline architecture composed of an instruction fetch stage achieved by the IDB 29, an instruction decode stage achieved by the decoder 18, and an execution stage where each component operates according to control signals output from the decoder 18.

FIGS. 6 and 7 are tables showing the operations for instructions, out of the instruction set for the processor 10, that are characteristic to the present invention and for machine instructions related to the characteristic instructions. Here, each square bracket in the operation column gives operations executed in parallel in one cycle (including operations executed at different timings in one cycle). The control procedure for having these operations performed by the stated components is implemented by the micro codes stored in the µROM 18a. The following is a description of the operation specified by each machine instruction, that is, the operation of each component when the decoder 18 decodes each machine instruction and outputs its corresponding control signals.

(a) Subroutine Call Stack Reserve Instruction "Call-label"

With this instruction, a branch to the subroutine starting from the label is performed, with the stack being reserved (extended) by one word prior to the execution of the subroutine. That is, the following operations (i), (ii), and (iii) are executed in one cycle. This instruction equates to an instruction where an operation for reserving a stack is added to the subroutine call instruction "call label" shown in FIG. 2 (the number of cycles is not changed).

(i) A return address is calculated and is stored in the LR 13. More specifically, the value in the FPC 15a is read, is incremented by four by the INC 16, and is stored in the LR 13.

(ii) A branch destination address is stored in the FPC 15a. More specifically, the operand label stored in the IDB 29 is stored in the FPC 15a.

(iii) The stack is reserved by one word. More specifically, the fixed value "−4" selected by the selector 32 is added to the value read from the SP 12 by the adder 22 and the addition result is stored in the SP 12. This reserving of the stack is performed to prepare for the following use of the stack.

(b) Subroutine Return Stack Release Instruction "rts+"

With this instruction, a branch is performed to return from the subroutine, with the stack being released (narrowed) by the amount of data that has been used. That is, the following operations (i) and (ii) are executed in one cycle. This instruction equates to an instruction where an operation for releasing a stack is added to the conventional subroutine return instruction "rts" shown in FIG. 2 (the number of cycles is not changed).

(i) A return address is stored in the PC 15. More specifically, the value in the LR 13 is transferred to the FPC 15a through the D bus 36 and is stored in the FPC 15a.

(ii) The stack is released by one word. More specifically, the value read from the SP 12 is added to the fixed value "+4" selected by the selector 32 and the addition result is stored in the SP 12. This stack release is performed to prepare for the next use of the used stack.

(c) Multiple Register Store Instruction "stm [R0, . . . , Rn]

With this instruction, values in all registers R0–Rn (at least part of registers of GR 11) specified by operands are saved on the stack. After a pair of the following operations (i) and (ii) is repeated n times (i=0 to n−1) (performed in n cycles), the operation (iii) is performed only once (in one cycle).

(i) The ith register Ri is saved on the stack specified by the SP 12. More specifically, the value in the SP 12 is transferred to the OAB 26 through the A bus 33 and the selector 30, is stored in the OAB 26, and is output from the OAB 26 to the data memory 38 as an operand address. At the same time, the value in the ith register Ri is transferred to the ODB 27 through the B bus 34 and the selector 31, is stored in the ODB 27, and is output from the ODB 27 to the data memory 38 as operand data.

(ii) The stack is reserved by one word. The specific operation is the same as that of (a)–(iii).

(iii) The last (the n+1th) register Rn is saved on the stack specified by the SP 12. The specific operation is the same as that of (c)–(i).

(d) Multiple Register Store Stack Reserve Instruction "stm-[R0, . . . , Rn]

With this instruction, values in all registers R0–Rn specified by operands are saved on the stack. That is, a pair of the operations (i) and (ii) of the multiple register store instruction "stm [R0, . . . , Rn]" is repeated n+1 times (i=0–n). Note that this instruction equates to an instruction where an operation for reserving the stack is added after the last operation of the multiple register store instruction "stm [R0, . . . , Rn]" (the number of cycles is not changed). The stack is reserved by the last operation of this instruction to prepare for the following use of the stack.

(e) Return Register Store Instruction "st LR"

With this instruction, the return address stored in the LR 13 is saved. That is the following operation (i) is performed in one cycle. It should be noted here that this instruction is not a specialized machine instruction for the processor 10 as can be seen from FIGS. 1 and 2. However, as described later, this instruction is characterized by being used alternatively with the following machine instruction (f) by the compiler of the present invention.

(i) The value in LR 13 is saved on the stack specified by the SP 12. More specifically, the value in the SP 12 is transferred to the OAB 26 through the A bus 33 and the selector 30, is stored in the OAB 26, and is output from the OAB 26 to the data memory 38 as an operand address. The value in the LR 13 is transferred to the ODB 27 through the B bus 34 and the selector 31, is stored in the ODB 27, and is output from the ODB 27 to the data memory 38 as operand data.

(f) Return Register Store Stack Reserve Instruction "St–LR"

With this instruction, the return address stored in the LR 13 is saved, with the stack being reserved by one word prior to the execution of the return. That is, the following operations (i) and (ii) are performed in one cycle. This instruction equates to an instruction where an operation for reserving the stack is added to the return register store instruction "st LR" (the number of cycles is not changed).

(i) The value in the LR 13 is saved on the stack specified by the SP 12. The specific operation is the same as that of (e)–(i).

(ii) The stack is reserved by one word. The specific operation is the same as that of (a)–(iii). This stack reserve is performed to prepare for the following use of the stack (g) Multiple Register Load Instruction "ldm [R0, . . . , Rn]

With this instruction, all registers R0–Rn specified by operands (at least part of the GR 11) are restored to the values saved on the stack. After a pair of the following operations (i) and (ii) is repeated n times (i=n to 1), the operation (iii) is performed only once (in one cycle). Note that this instruction equates to an instruction by which data is transferred in an opposite direction of the multiple register store instruction "stm [R0, . . . , Rn]".

(i) The ith register Ri is restored to data saved on the stack specified by the SP 12. More specifically, the value in the SP 12 is transferred to the OAB 26 through the A bus 33 and the selector 30, is stored in the OAB 26, and is output from the OAB 26 to the data memory 38 as an operand address. Data transferred from the data memory 38 to the ODB 27 is stored in the register Ri through the C bus 35.

(ii) The stack is released by one word. The specific operation is the same as that of (b)–(ii).

(iii) The register R0 is restored to the data saved on the stack specified by the SP 12. The specific operation is the same as that of (g)–(i).

(h) Multiple Register Load Stack Release Instruction "ldm+[R0, . . . , Rn]"

With this instruction, all registers R0–Rn specified by operands (at least part of the GR 11) are restored to data saved on a stack. That is, a pair of the operations of the multiple register load instruction "ldm [R0, . . . , Rn]" is repeated n times (i=n to 0) Note that this instruction equates to an instruction where an operation for releasing the stack is added after the last operation of the multiple register load instruction "ldm [R0, . . . , Rn]" (the number of cycles is not changed). The stack is released by the last operation to prepare for the next use of the used stack.

(i) Return Register Load Instruction "ld LR"

With this instruction, the LR 13 is restored to the return address saved on the stack. That is, the following operation (i) is performed in one cycle. It should be noted here that this instruction is not a specialized machine instruction for the processor 10 as can be seen from FIGS. 1 and 2. However, as described later, this instruction is characterized by being used alternatively with the following machine instruction (j) by the compiler of the present invention.

(i) The LR 13 is restored to the data saved on the stack specified by the SP 12. More specifically, the value in the SP 12 is transferred to the OAB 26 through the A bus 33 and the selector 30, is stored in the OAB 26, and is output from the OAB 26 to the data memory 38 as an operand address. At the same time, data transferred from the data memory 38 to the ODB 27 is stored in the LR 13 through the C bus 35.

(j) Return Register Load Stack Release Instruction "ld+LR"

With this instruction, the LR 13 is restored to the return address saved on the stack. That is, the following operations (i) and (ii) are performed in one cycle. This instruction equates to an instruction where an operation for releasing the stack is added to the stated return register load instruction "ld LR" (the number of cycles is not changed).

(i) The LR 13 is restored to the data saved on the stack specified by the SP 12. The specific operation is the same as that of (i)—(i).

(ii) The stack is released by one word. The specific operation is the same as that of (b)–(ii). This releasing of the stack is performed to prepare for the next use of the used stack.

Compiler

Figure 8:
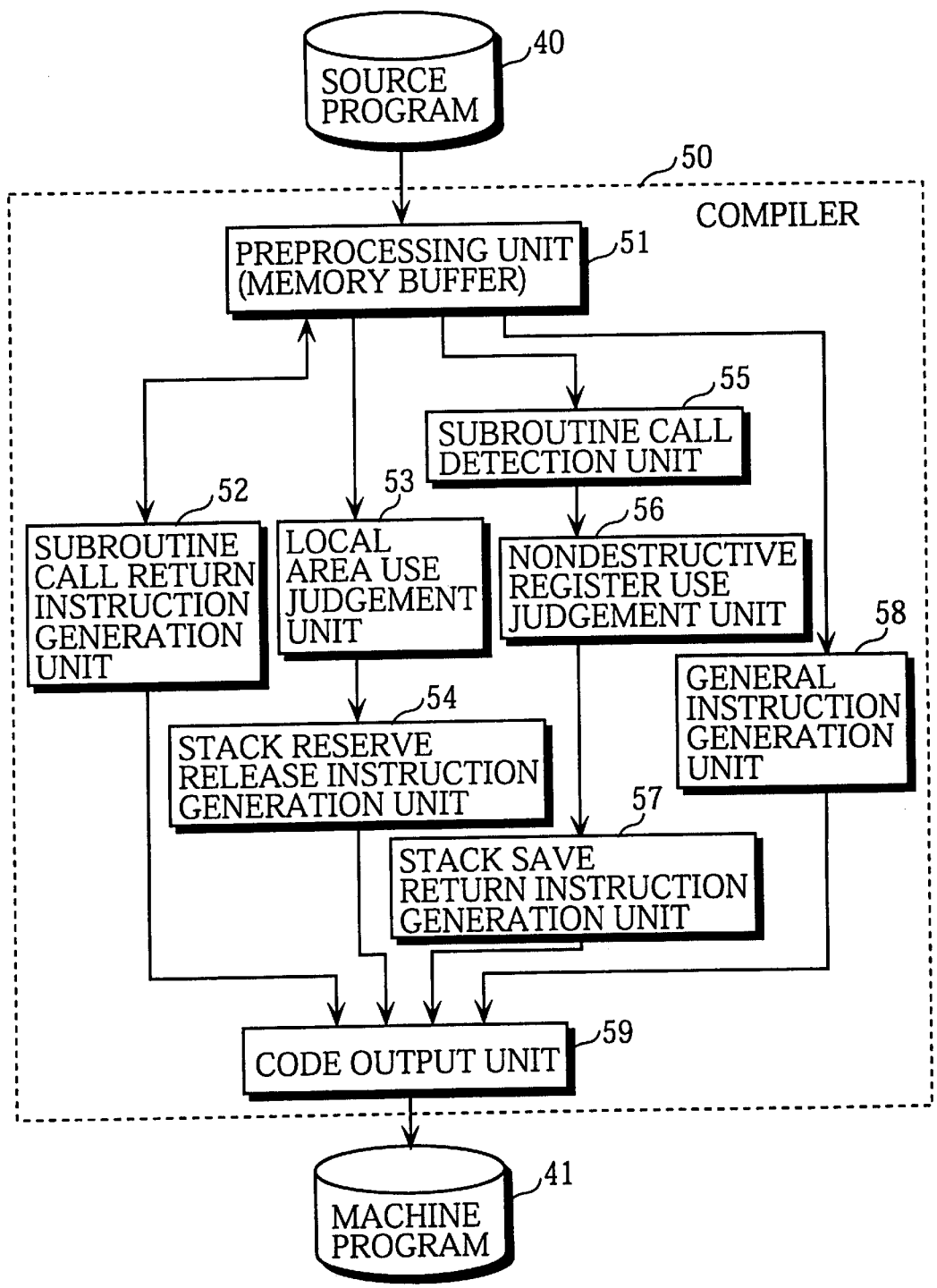
FIG. 8 is a functional block diagram showing the construction of the compiler of the present invention.

FIG. 8 is a functional block diagram showing the construction of the compiler 50 whose target processor is the processor 10 shown in FIG. 5. This compiler 50 is a language processor which translates the source program 40 written in a functional programming language, such as C language, into the machine language program 41 that can be decoded and executed by the stated processor 10. More specifically, the compiler 50 is achieved by a program executed by a general-purpose personal computer.

The compiler 50 can be roughly divided into a general functional block which is the same as that of a conventional compiler (the preprocessing unit 51 and the general instruction generation unit 58) and into a unique functional block related to the present invention (the subroutine call return instruction generation unit 52, the local area use judgement unit 53, the stack reserve release instruction generation unit 54, the subroutine call detection unit 55, the nondestructive register use judgement unit 56, the stack save return instruction generation unit 57, and the code output unit 59).

The preprocessing unit 51 reads the source program 40 stored in an auxiliary storage device or a memory and performs preprocessing, such as the syntactic analysis, the creation of a symbol table, the generation of an intermediate language program in function units, and the resource allocation (the mapping of variables to registers). That is, the preprocessing unit 51 performs various processes that prepare the source program 40 for the conversion into specific machine instructions.

The general instruction generation unit 58 translates general program parts which are not related to the subroutine call/return and the register save/restore in the intermediate language program generated by the preprocessing unit 51. That is, the general instruction generation unit 58 generates machine instructions not shown in FIGS. 6 and 7 (but the machine instructions shown in FIG. 2, for instance) in the instruction set of the processor 10.

The subroutine call return instruction generation unit 52 detects function units in the intermediate language program generated by the preprocessing unit 51, generates instructions corresponding to entrances and exits of the detected function units, which is to say pairs of a subroutine call stack reserve instruction "call–" and a subroutine return stack release instruction "rts+", and sends the generated instructions to the code output unit 59.

The local area use judgement unit 53 judges whether each function of the intermediate program generated by the preprocessing unit 51 requires a local area. More specifically, the number of local variables declared in each function (the number of words) is counted and the count result is sent to the stack reserve release instruction generation unit 54.

The stack reserve release instruction generation unit 54, when the number of words "n" sent from the stack reserve release instruction generation unit 54 is not zero, generates the instruction "sub 4*n, SP" for reserving a stack by the number of words "n" in one operation and the instruction "add 4*n, SP" for releasing the stack in one operation and sends the generated instructions to the code output unit 59.

The subroutine call detection unit 55 judges whether each function of the intermediate program generated by the preprocessing unit 51 includes a subroutine call (a function call) and sends the judgement result to the nondestructive register use judgement unit 56. More specifically, it is judged whether a function is described in the declaration of each target function.

The nondestructive register use judgement unit 56 judges whether each function sent from the subroutine call detection unit 55 needs to use (destroy) at least one nondestructive register (at least one of the predetermined registers R2 and R3, in this example) and sends the judgement result and the detection result sent from the subroutine call detection unit 55 to the stack save return instruction generation unit 57. When the function includes an expression for calculating three or more variables at a time (an arithmetic logic operation expression whose right side includes three or more variables), for instance, the nondestructive register use judgement unit 56 judges that at least one nondestructive register needs to be used.

The stack save return instruction generation unit 57 generates a predetermined machine instruction set according to the detection result by the subroutine call detection unit 55 and the judgement result by the nondestructive register use judgement unit 56 and sends the generated instruction set to the code output unit 59. More specifically, when a nondestructive register is not used even though a subroutine has been detected, the stack save return instruction generation unit 57 generates a return register store instruction "st LR" and a return register load instruction "ld LR". When at least one nondestructive register is used even though no subroutine has been detected, the stack save return instruction generation unit 57 generates a multiple register store instruction "stm [nondestructive registers to be used]" and a multiple register load instruction "ldm [nondestructive registers to be used]". When a subroutine is detected and at least one nondestructive register is used, the stack save return instruction generation unit 57 generates a multiple register store stack reserve instruction "stm–[nondestructive registers to be used]", a return register store instruction "st LR", a return register load stack reserve instruction "ld+ LR", and a multiple register load instruction "ldm [nondestructive registers to be used]".

The code output unit 59 receives machine instructions generated by the instruction generation units 52, 54, 57, and 58 for each function, places (rearranges) the received machine instructions in (using) a predetermined location in the internal temporary storage area of the code output unit 59 to compose machine instruction sets in function units, and outputs the composed machine instruction sets to an auxiliary storage device or a memory as the machine program 41. When the instruction generation units 52, 54, 57, and 58 generate machine instructions for a function, for instance, the code output unit 59 generates a subroutine call stack reserve instruction "call–", an instruction "stm" or "stm–" for saving nondestructive registers, an instruction "st" for saving a return register, an instruction "sub" for reserving a stack for a local area, general instructions, an instruction "add" for releasing the stack for the local area, an instruction "ld" or "ld+" for restoring the return register, an instruction "ldm" for restoring nondestructive registers, and a subroutine return stack release instruction "rts+", and outputs these instructions in the order.

Figure 9:
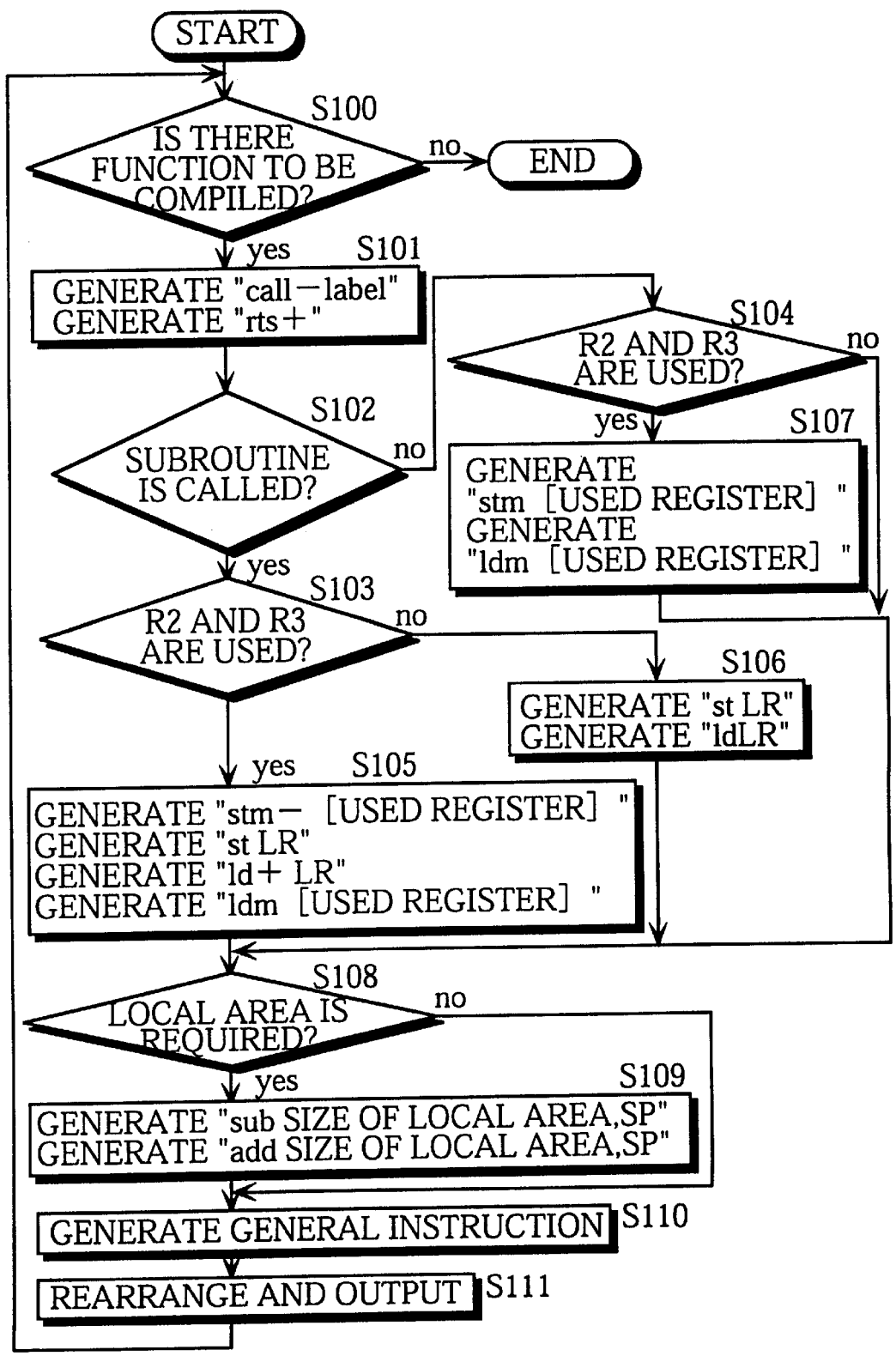
FIG. 9 is a flowchart showing the operation procedure of the compiler of the present invention.

FIG. 9 is a flowchart showing the characteristic operations of the compiler 50 shown in FIG. 8. The preprocessing unit 51 converts the source program 40 into an intermediate language program in function units (step S100) and the following steps (steps S101–S109) are performed for each function.

The subroutine call return instruction generation unit 52 generates the subroutine call stack reserve instruction "call–" for calling a target function and the subroutine return stack release instruction "rts+" for returning from the function (step S101).

The subroutine call detection unit 55 judges whether the function calls a subroutine (function) at least once (step S102). The nondestructive register use judgement unit 56 judges whether the function uses at least one of the nondestructive registers R2 and R3 (steps S103 and S104).

When the subroutine call detection unit 55 judges that the target function calls at least one subroutine and uses at least one of the nondestructive register R2 and R3 (steps S102 and S103), a machine instruction set for effectively saving and restoring the used nondestructive registers is generated (step S105). The generated machine instruction set includes a multiple register store stack reserve instruction "stm– [used nondestructive registers]", a return register store instruction "st LR", a return register load stack reserve instruction "ld+ LR", and a multiple register load instruction "ldm [used nondestructive registers]".

When the subroutine call detection unit 55 judges that the target function calls at least one subroutine but does not use the nondestructive registers R2 and R3 (steps S102 and S103). a machine instruction set for effectively saving and restoring only the return register, which is to say a return register store instruction "st LR" and a return register load instruction "ld LR", is generated (step S106).

When the subroutine call detection unit 55 judges that the target function does not call a subroutine but uses at least one of the nondestructive registers R2 and R3 (steps S102 and S104), a machine instruction set for effectively saving and restoring the used nondestructive registers, which is to say a multiple register store instruction "stm " [used nondestructive registers] and a multiple register load instruction "ldm [used nondestructive registers]", is generated (step S107).

The local area use judgement unit 53 judges whether the target function requires a local area (step S108). only when the judgement result is affirmative, the stack reserve release instruction generation unit 54 generates an instruction "sub (necessary size), SP" for reserving a stack by a necessary size in one operation and an instruction "add (necessary size), SP" for releasing the stack in one operation (step S109).

After the characteristic machine instructions have been generated, the general instruction generation unit 58 generates general machine instructions corresponding to the main process for the target function, which is to say the processes that are not related to the subroutine call/return and the register save/restoration (step S110).

The code output unit 59 rearranges all machine instructions generated in steps S101, S105–S107, S109, and S110 in the above-stated order and outputs the rearranged machine instructions to an auxiliary storage device as the machine program 41 composing the function (step S111).

The operations of the processor 10 and the compiler 50 having the stated constructions are described below by means of eight examples of the source program 40 and the machine program 41. It should be noted here that the eight examples of the source program 40 differ from one another in the properties of the function defined in the source program 40. Each defined function corresponds to one of all combinations of the following judging operations: (1) whether a subroutine is called at least once; (2) whether at least one of the nondestructive registers R2 and R3 is used; and (3) whether a local area is used.

FIG. 10 is a program list showing the first example of the source program 40 written in C language, where a subroutine is called at least once, at least one of the nondestructive registers R2 and R3 is used, and the function "f" which uses a local area is called. This source program 40 defines five global variables i0–i3 and j, the main function "main" for calling the function "f", and the function "f". The function "f" declares four local variables l0–l3, assigns values or the global variables i0–i3 to the local variables l0–l3, calculates the sum of the values, assigns the sum to the global variable j, and calls the function "g".

FIG. 11 is a list of the machine program 41 generated from the source program shown in FIG. 10 by the compiler 50.

The subroutine call return instruction generation unit 52 generates the subroutine call stack reserve instruction "call– f" 121 for calling the function "lf" and the subroutine return stack release instruction "rts+" 129 for returning from the function "f" because the main function "main" of the source program shown in FIG. 10 calls the function "f" (step S101).

The stack save return instruction generation unit 57 generates the machine instruction set for effectively saving and restoring the LR 13 and the nondestructive registers R2 and R3, which is to say the multiple register store stack reserve instruction "stm– [R2, R3]" 122, the return register store instruction "st LR" 123, the return register load stack reserve instruction "ld+ LR" 127, and the multiple register load instruction "ldm [R2, R3]" 128, because the function "f" of the source program shown in FIG. 10 calls the function "g" and includes an addition expression that handles four variables (j=l0+l1+l2+l3) (step S105).

The stack reserve release instruction generation unit 54 generates the instruction "sub 16, SP" 124 for reserving a local area (a stack) by four words in one operation and the instruction "add 16, SP" 126 for releasing the local area in one operation because the function "f" of the source program shown in FIG. 10 declares four local variables (step S109).

It should be noted here that because the function "f" of the source program 40 shown in FIG. 10 assigns the values of the four global variables I0–I3 to the local variables l0–l3, assigns the sum of the values to the global variable j, and calls the function "g", the general instruction generation unit 58 generates general machine instructions 125 corresponding to these operations (step S110).

Figure 12:
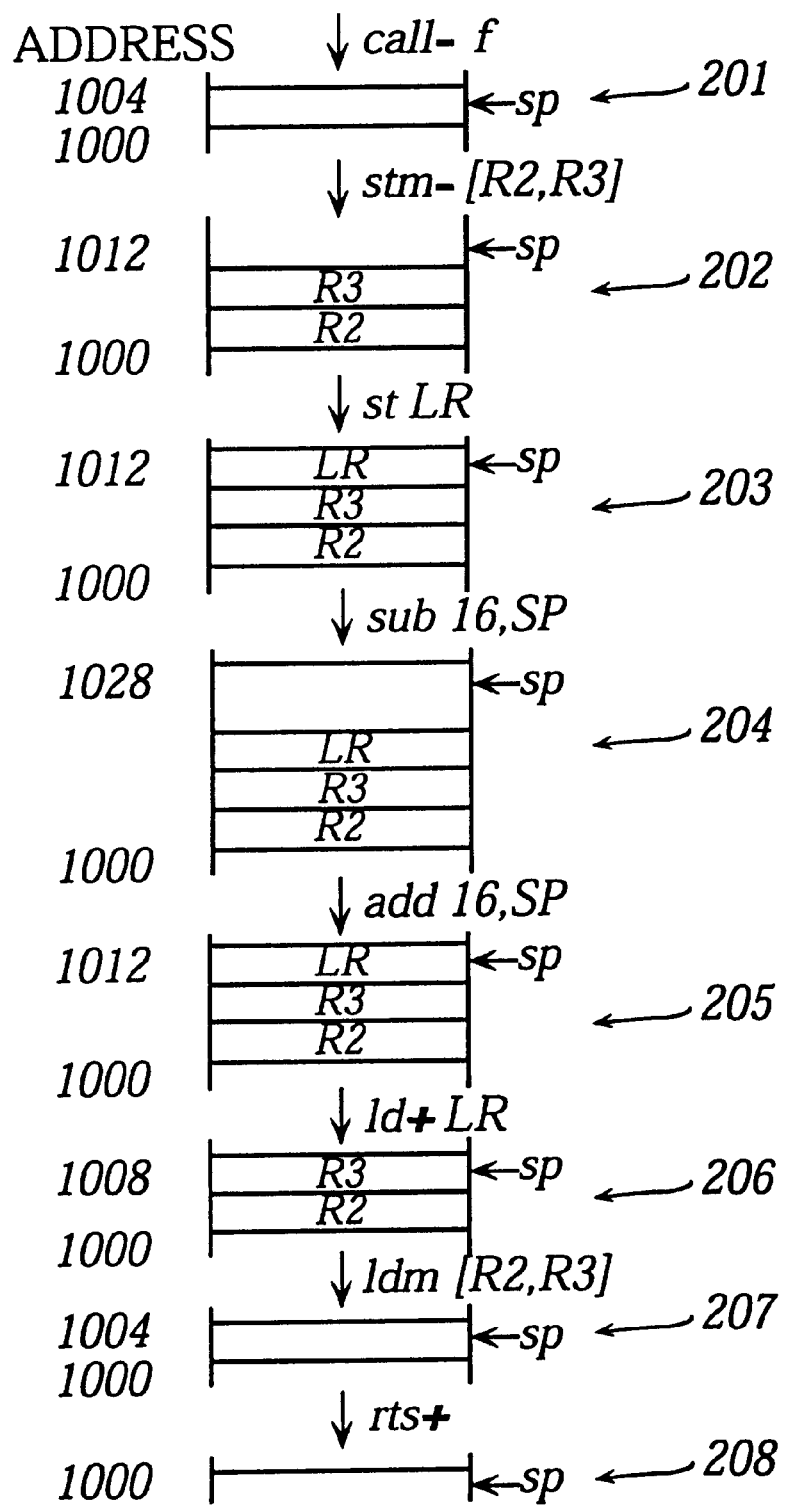
FIG. 12 shows changes in the stack contents, the stack size, and the value of the SP in the first example.

FIG. 12 shows changes in the stack contents, the stack size, and the value of the SP 12 when the processor executes the machine program 41 shown in FIG. 11.

FIGS. 13A and 13B are timing charts showing the operation of the processor 10 in each cycle in respectively the former half (steps S121–S124) and the latter half (steps S126–S129) of the machine instructions shown in FIG. 11.

When decoding the subroutine call stack reserve instruction "call– f", the processor 10 (i) calculates the return address and stores the return address in the LR 13; (ii) stores the branch address "f" in the FPC 15a, and (iii) reserves a stack by one word. By doing so, the branch is performed, with the stack being reserved by one word beforehand. As a result, the stack is set in the first state 201 shown in FIG. 12.

When decoding the multiple register store stack reserve instruction "stm– [R2, R3]", the processor 10 (i) saves the register R2 on the stack specified by the SP 12 and (ii) reserves the stack by one word in the first cycle, and (iii) saves the register R3 on the stack specified by the SP12 and (iv) reserves the stack by one word in the second cycle. By doing so, each of the nondestructive register R2 and R3 is saved, with the stack being reserved by one word beforehand. As a result, the stack is set in the second state 202 shown in FIG. 12.

When decoding the multiple register store instruction "st LR" 123, the processor 10 saves the value of the LR 13 on the stack specified by the SP 12 in one cycle. By doing so, the return address is saved and the stack is set in the third state 203 shown in FIG. 12.

When decoding the instruction "sub 16, SP" for reserving the stack in one operation, the processor 10 subtracts 16 from the value of the SP 12 using the ALU 14 and stores the subtraction result in the SP 12 in one cycle. By doing so, the stack is reserved by four words and the stack is set in the fourth state 204 shown in FIG. 12.

The processor 10 decodes and executes the general machine instructions 125. However, this operation does not change the state of the stack.

When decoding the instruction "add 16, SP" for releasing the stack in one operation, the processor 10 adds 16 to the value of the SP 12 using the ALU 14 and stores the addition result in the SP 12. By doing so, the stack is released by four words and the stack is set in the fifth state 205 shown in FIG. 12.

When decoding the return register load stack reserve instruction "ld+ LR" 127, the processor 10 (i) restores the LR 13 to data saved on the stack specified by the SP 12 and (ii) releases the stack by one word in one cycle. By doing so, the return address is restored, with the stack being released by one word. AS a result, the stack is set in the sixth state 206 shown in FIG. 12.

When decoding the multiple register load stack release instruction "ldm [R2, R3]" 128, the processor 10 (i) restores the register R3 to data saved on the stack specified by the SP 12 and (ii) releases the stack by one word in the first cycle, and (iii) restores the register R2 to data saved on the stack specified by the SP 12 and (iv) releases the stack by one word in the second cycle. By doing so, the two nondestructive register R2 and R3 are restored and the stack is set in the seventh state shown in FIG. 12.

When decoding the subroutine return stack release instruction "rts+" 129, the processor 10 (i) stores the return address in the PC 15 and (ii) releases the stack by one word in one cycle. By doing so, the stack is released by one word and the stack is set in the eighth state shown in FIG. 12.

Figure 4A:
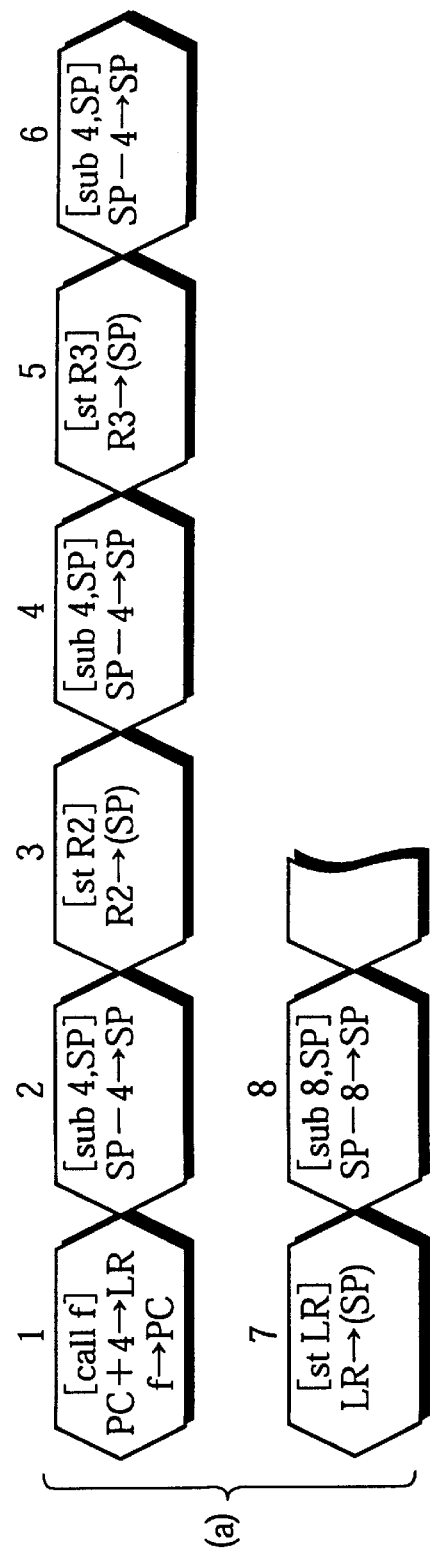
FIGS. 4A and 4B are timing charts which show the operation performed by the conventional processor in each cycle in respectively the former half and the latter half of the machine instructions shown in FIG. 1.
Figure 4B:
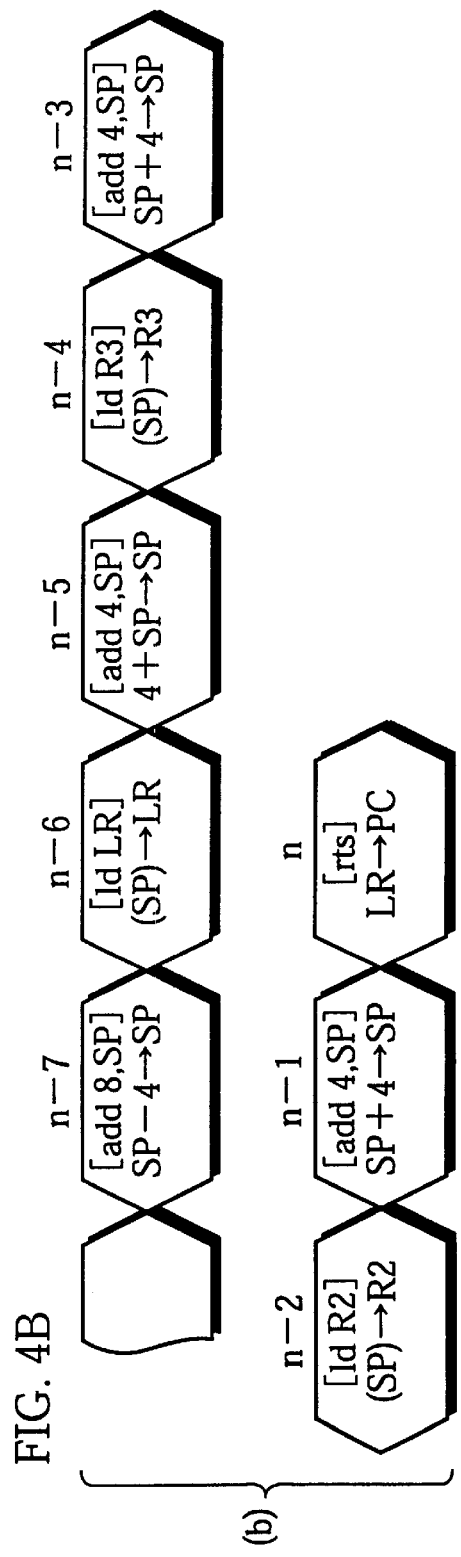

As can be seen by comparing FIGS. 13A and 13B with FIGS. 4A and 4B related to a conventional technique, the compiler 50 and the processor 10 of the present invention performs the subroutine call/return and the register save/ restoration in a shorter time than a conventional compiler and processor. More specifically, the branch to the subroutine "f", the saving of two nondestructive registers R2 and R3, the saving of the return register LR, and the reserving of the local area are performed in the first-fifth cycles by the compiler 50 and the processor 10, as shown in FIG. 13A. On the other hand, the same operations are performed in the first-eighth cycles by the conventional compiler and processor, as shown in FIG. 4A. Therefore, the compiler 50 and the processor 10 shorten the precessing time necessary for these operations by three cycles. Similarly, the release of the local area, the restoration of the return register LR, the restoration of two nondestructive registers R2 and R3, and the return from the subroutine "f" are performed in the (I–4)th to the Tth cycles by the compiler 50 and the processor 10, as shown in FIG. 13B. The same operations are performed in the (n–7)th to nth cycles by the conventional compiler and processor, as shown in FIG. 4B. Therefore, the compiler 50 and the processor 10 shorten the processing time necessary for these operations by three cycles.

This is because the reserving and release of a stack which are performed independently (in one cycle, respectively) by the conventional compiler and processor are respectively combined (are arranged in parallel with) with the subroutine call and the register saving by the compiler 50 and the processor 10. More specifically, an operation for reserving a stack is included in the subroutine call stack reserve instruction "call–". As a result, the processing time is shortened by one cycle. Operations for reserving a stack twice are included in the multiple register store stack reserve instruction "stm–". As a result, the processing time is shortened by two cycles. Similarly, an operation for releasing a stack is included in each of the return register load stack release instruction "ld+", the multiple register load instruction "ldm", and the subroutine return stack release instruction "rts+". As a result, the processing time is shortened by one cycle per stack releasing.

As described above, the compiler 50 of the present invention converts the source program 40 into machine instructions of higher parallelism. The processor 10 of the present invention executes the machine instructions in less cycles than a conventional processor. This means that the processor 10 executes the machine instructions at high speed.

Figure 16:
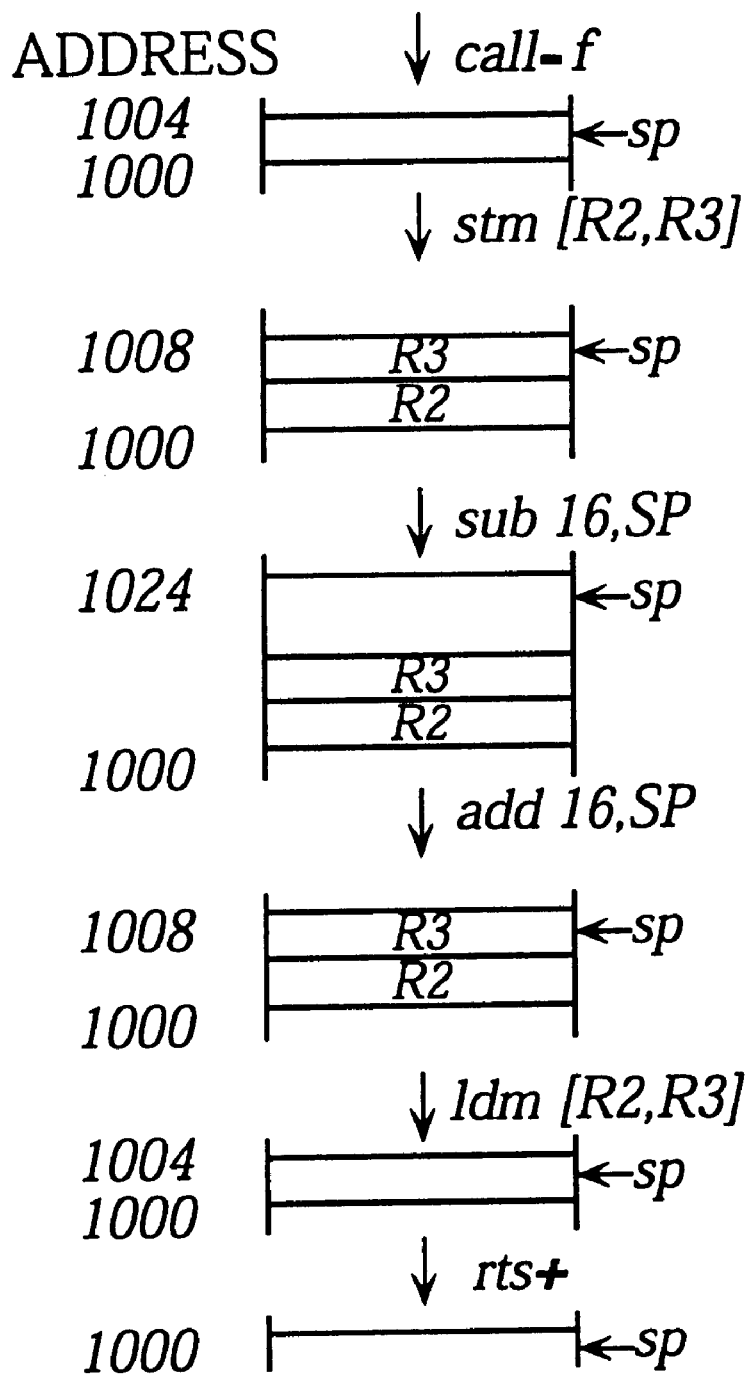
FIG. 16 shows changes in the stack contents, the stack size, and the value of the SP in the second example.

FIG. 14 is a program list showing the second example of the source program 40. The source program 40 of the second example differs from that of the first example in that the function "f" does not call the function (subroutine) "g". FIG. 15 is a list of the machine program 41 generated from the source program 40 shown in FIG. 14 by the compiler 50. FIG. 16 shows changes in the stack contents, the stack size, and the value of the SP 12 when the processor 10 executes the machine program 41 shown in FIG. 15.

The machine program 41 shown in FIG. 15 includes machine instructions unique to the processor 10 (the former half of the machine program 41 where the function "f" is called includes the subroutine call stack reserve instruction "call–" and the multiple register store stack reserve instruction "stm–", and the latter half includes the multiple register load stack reserve instruction "ld+", the multiple register load instruction "ldm", and the subroutine return stack release instruction "rts+"). Therefore, when the processor 10 executes the machine program 41, the execution time for calling the function "f" and that for returning from the function "f" are each shortened by three cycles, in comparison with the case of a conventional processor.

Figure 17:
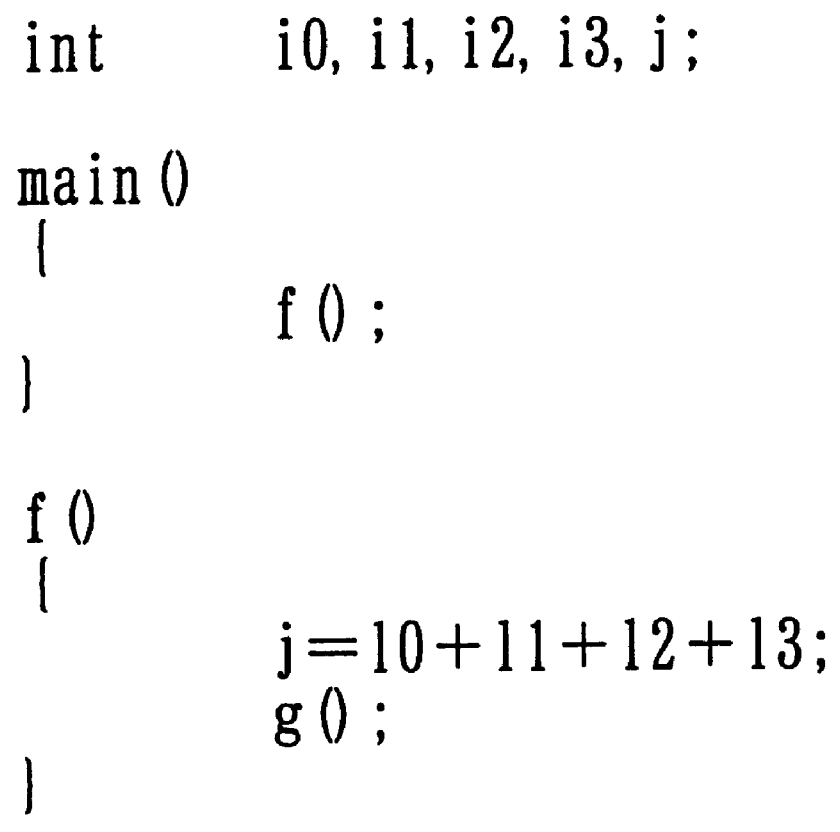
Figure 19:
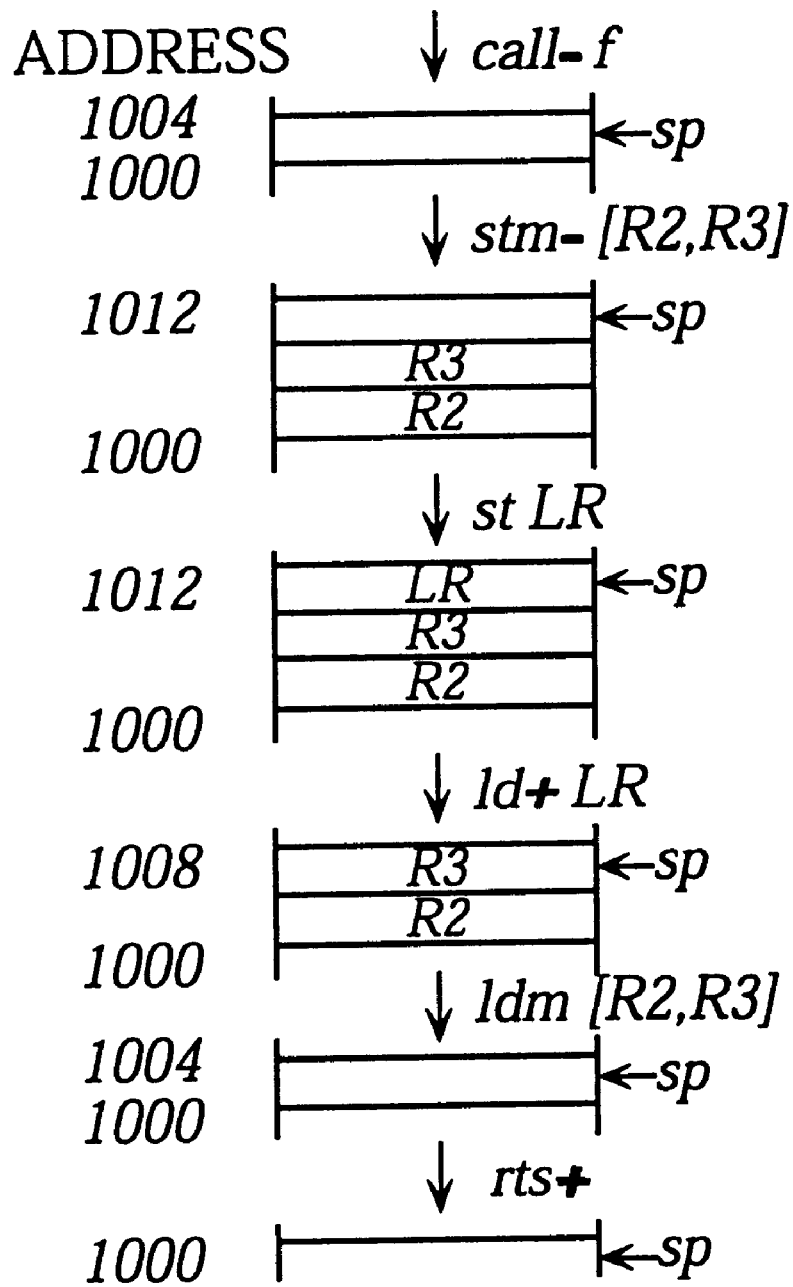
FIG. 19 shows changes in the stack contents, the stack size, and the value of the SP in the third example.

FIG. 17 is a program list showing the third example of the source program 40. The source program 40 of the third example differs from that of the first example shown in FIG. 10 in that the function "f" does not use a local area. FIG. 18 is a list of the machine program 41 generated from the source program 40 shown in FIG. 17 by the compiler 50. FIG. 19 shows changes in the stack contents, the stack size, and the value of the SP 12 when the processor 10 executes the machine program 41 shown in FIG. 18.

The machine program 41 shown in FIG. 18 includes machine instructions unique to the processor 10 (the former half of the machine program 41 where the function "f" is called includes the subroutine call stack reserve instruction "call–" and the multiple register store stack reserve instruction "stm–", and the latter half includes the multiple register load stack reserve instruction "ld+", the multiple register load instruction "ldm", and the subroutine return stack release instruction "rts+"). Therefore, when the processor 10 executes the machine program 41, the execution time for calling the function "f" and that for returning from the function "f" are each shortened by three cycles, in comparison with the case of a conventional processor.

Figure 22:
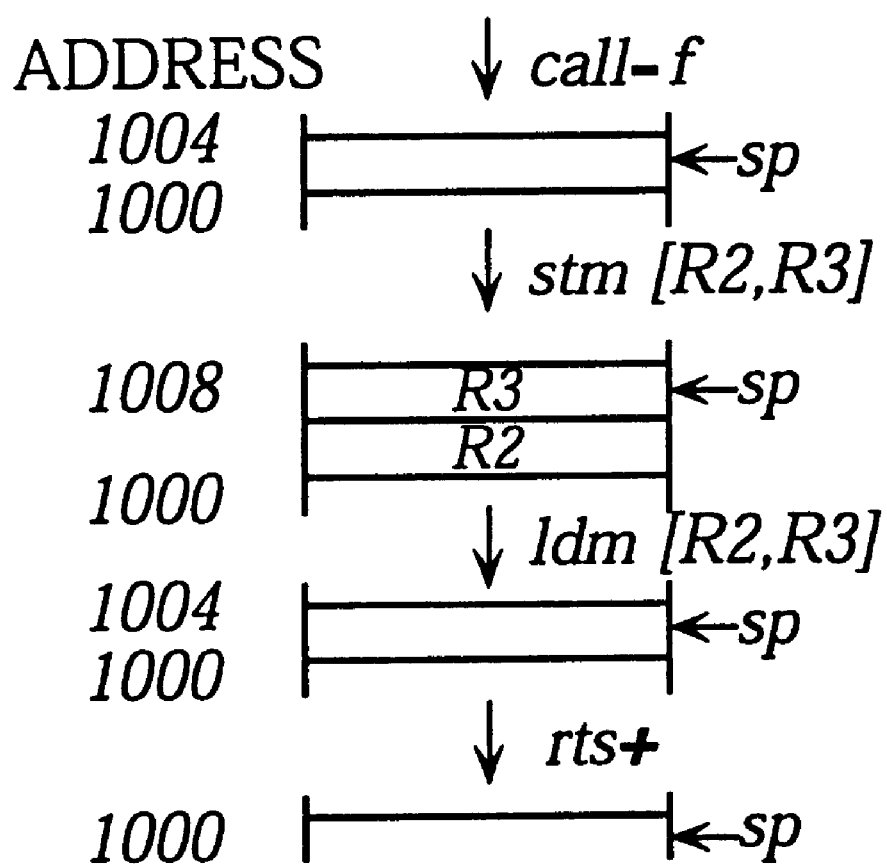
FIG. 22 shows changes in the stack contents, the stack size, and the value of the SP in the fourth example.

FIG. 20 is a program list showing the fourth example of the source program 40. The source program 40 of the fourth example differs from that of the first example shown in FIG. 10 in that the function "If" does not call the function (subroutine) "g" and does not use a local area. FIG. 21 is a list of the machine program 41 generated from the source program 40 shown in FIG. 20 by the compiler 50. FIG. 22 shows changes in the stack contents, the stack size, and the value of the SP 12 when the processor 10 executes the machine program 41 shown in FIG. 21.

The machine program 41 shown in FIG. 21 includes machine instructions unique to the processor 10 (the former half of the machine program 41 where the function "f" is called includes the subroutine call stack reserve instruction "call–" and the multiple register store instruction "stm", and the latter half includes the multiple register load instruction "ldm" and the subroutine return stack release instruction "rts+"). Therefore, when the processor 10 executes the machine program 41, the execution time for calling the function "f" and that for returning from the function "f" are each shortened by two cycles, in comparison with the case of a conventional processor.

Figure 23:
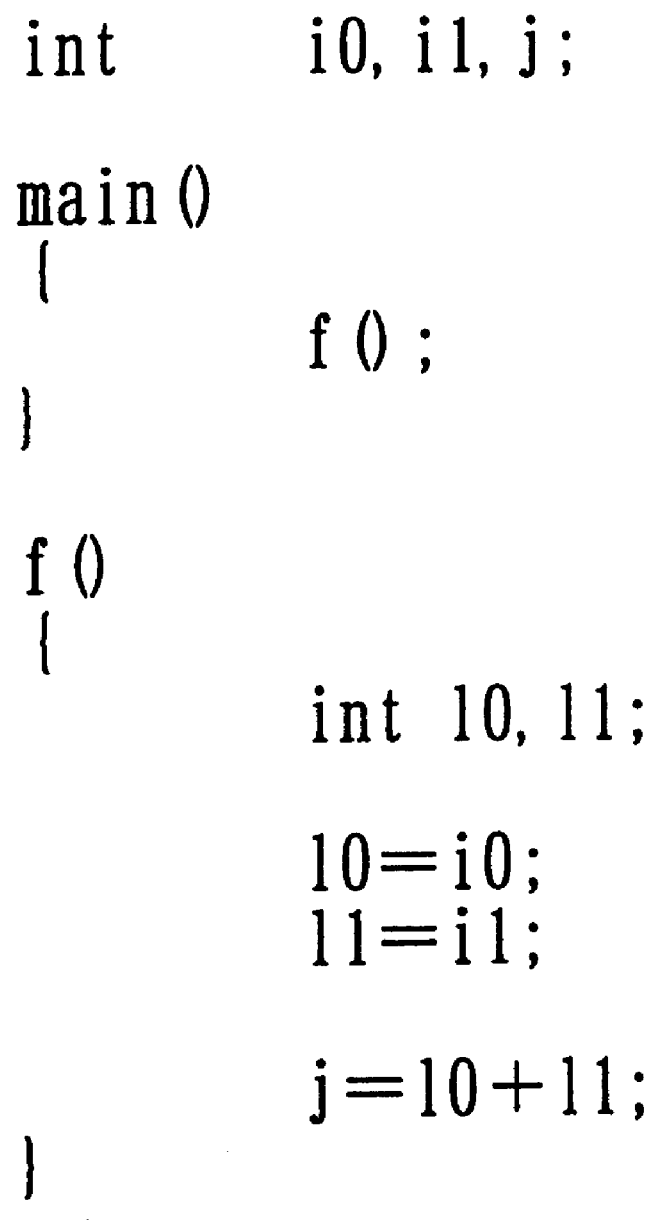

FIG. 23 is a program list showing the fifth example of the source program 40. The source program 40 of the fifth example differs from that of the first example shown in FIG.

Figure 25:
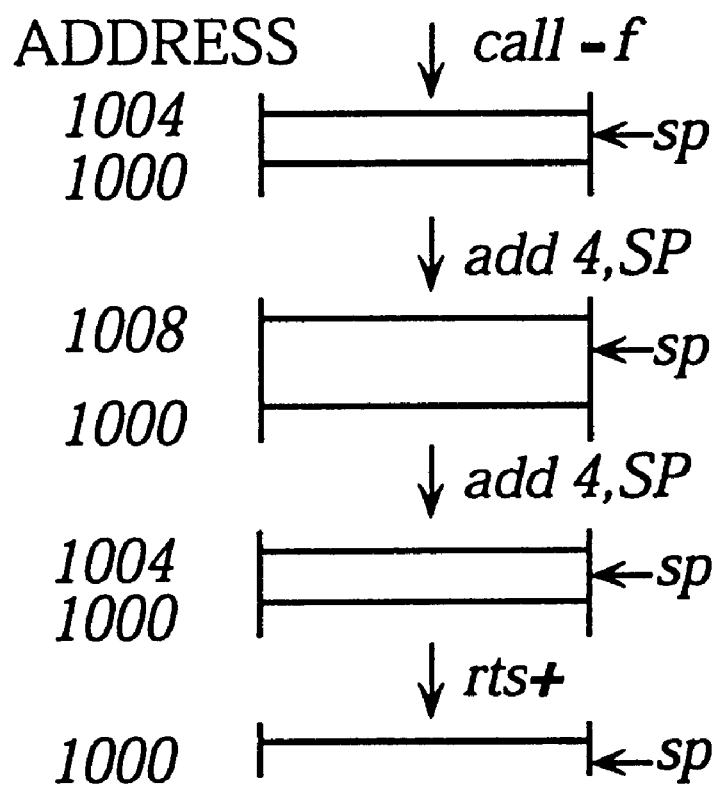
FIG. 25 shows changes in the stack contents, the stack size, and the value of the SP in the fifth example.

10 in that the function "f" does not call the function (subroutine) "g" and does not use the nondestructive registers R2 and R3. FIG. 24 is a list of the machine program 41 generated from the source program 40 shown in FIG. 23 by the compiler 50. FIG. 25 shows changes in the stack contents, the stack size, and the value of the SP 12 when the processor 10 executes the machine program 41 shown in FIG. 24.

The machine program 41 shown in FIG. 24 includes machine instructions unique to the processor 10 (the former half of the machine program 41 where the function "f" is called includes the subroutine call stack reserve instruction "call–" and the latter half includes the subroutine return stack release instruction "rts+") Therefore, when the processor 10 executes the machine program 41, the execution time for calling the function "f" and that for returning from the function "f" are each shortened by one cycle, in comparison with the case of a conventional processor.

Figure 28:
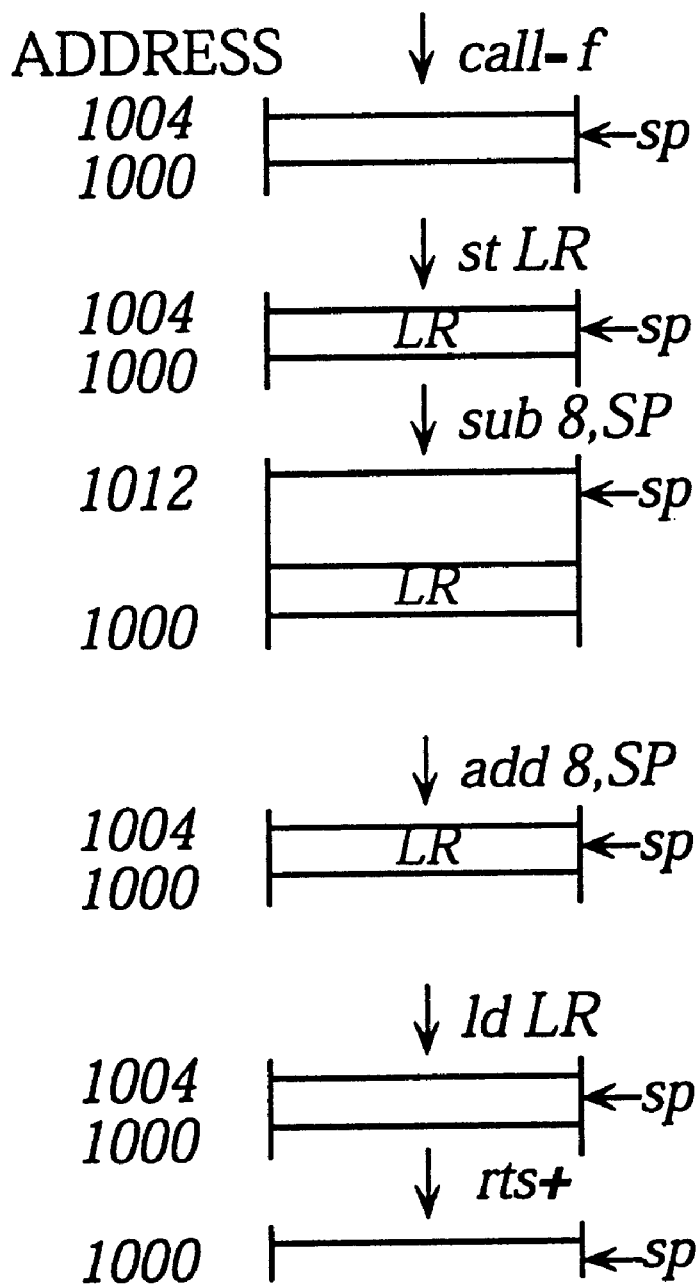
FIG. 28 shows changes in the stack contents, the stack size, and the value of the SP in the sixth example.

FIG. 26 is a program list showing the sixth example of the source program 40. The source program 40 of the sixth example differs from that of the first example shown in FIG. 10 in that the function "f" does not use the nondestructive registers R2 and R3. FIG. 27 is a list of the machine program 41 generated from the source program 40 shown in FIG. 26 by the compiler 50. FIG. 28 shows changes in the stack contents, the stack size, and the value of the SP 12 when the processor 10 executes the machine program 41 shown in FIG. 27.

The machine program 41 shown in FIG. 27 includes machine instructions unique to the processor 10 (the former half of the machine program 41 where the function "f" is called includes the subroutine call stack reserve instruction "call–" and the latter half includes the subroutine return stack release instruction "rts+"). Therefore, when the processor 10 executes the machine program 41, the execution time for calling the function "f" and that for returning from the function "f" are each shortened by one cycle, in comparison with the case of a conventional processor.

Figure 31:
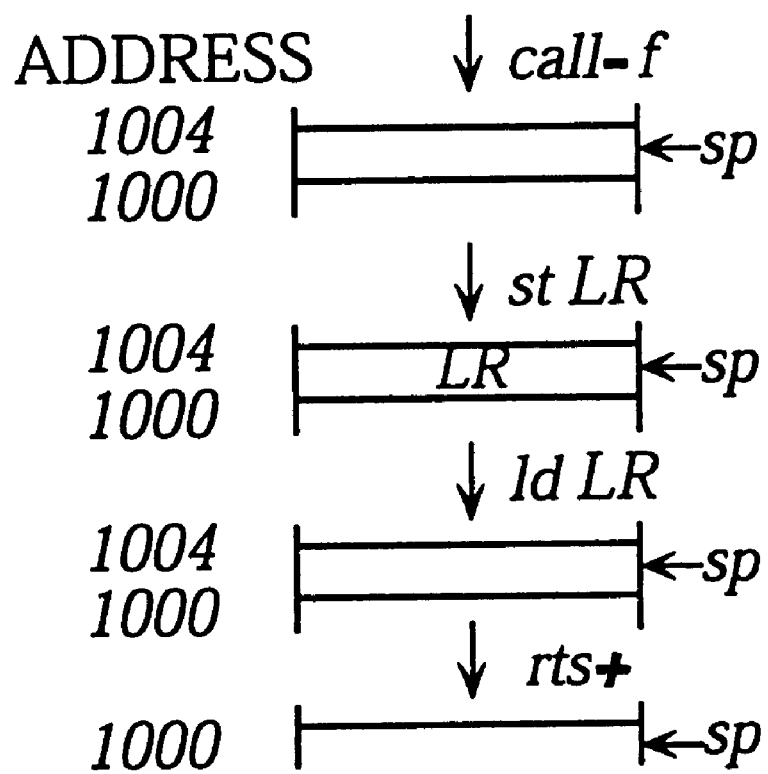
FIG. 31 shows changes in the stack contents, the stack size, and the value of the SE in the seventh example.

FIG. 29 is a program list showing the seventh example of the source program 40. The source program 40 of the seventh example differs from that of the first example shown in FIG. 10 in that the function "f" does not use the local area and the nondestructive registers R2 and R3. FIG. 30 is a list of the machine program 41 generated from the source program 40 shown in FIG. 29 by the compiler 50. FIG. 31 shows changes in the stack contents, the stack size, and the value of the SP 12 when the processor 10 executes the machine program 41 shown in FIG. 30.

The machine program 41 shown in FIG. 30 includes machine instructions unique to the processor 10 (the former half of the machine program 41 where the function "f" is called includes the subroutine call stack reserve instruction "call–" and the latter half includes the subroutine return stack release instruction "rts+"). Therefore, when the processor 10 executes the machine program 41, the execution time for calling the function "f" and that for returning from the function "f" are each shortened by one cycle, in comparison with the case of a conventional processor.

Figures 32, 33, 34:
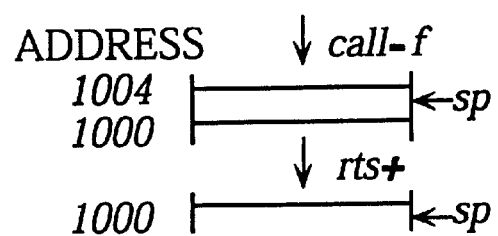
FIG. 32 is a list of the source program of the eighth example.
FIG. 33 is a list of the machine program of the eighth example.
FIG. 34 shows changes in the stack contents, the stack size, and the value of the SP in the eighth example.

FIG. 32 is a program list showing the eighth example of the source program 40. The source program 40 of the eighth example differs from that of the first example shown in FIG. 10 in that the function "f" does not call the function (subroutine) "g" and does not use the local area and the nondestructive registers R2 and R3. FIG. 33 is a list of the machine program 41 generated from the source program 40 shown in FIG. 32 by the compiler 50. FIG. 34 shows changes in the stack contents, the stack size, and the value of the SP 12 when the processor 10 executes the machine program 41 shown in FIG. 33.

The machine program 41 shown in FIG. 33 includes machine instructions unique to the processor 10 (the former half of the machine program 41 where the function "f" is called includes the subroutine call stack reserve instruction "call–" and the latter half includes the subroutine return stack release instruction "rts+"). Therefore, when the processor 10 executes the machine program 41, the execution time for calling the function "f" and that for returning from the function "f" are each shortened by one cycle, in comparison with the case of a conventional processor.

Modification of Compiler

The following is a description of a modification of the compiler 50 described above. In the embodiment, when a target function calls a subroutine and uses nondestructive registers, the stack save return instruction generation unit 57 of the compiler 50 generates the multiple register store stack reserve instruction "stm–", the multiple register store instruction "st", the multiple register load stack reserve instruction "ld+", and the multiple register load instruction "ldm". However, the stack save return instruction generation unit 57 may generate another machine instruction set equivalent to the machine instruction set including these instructions. That is, the stack save return instruction generation unit 57 may generate a multiple register store stack reserve instruction "st–", a multiple register store instruction "stm", a multiple register load stack reserve instruction "ldm+", and the return register load instruction "ld".

In this case, the code output unit 59 rearranges the machine instructions generated by the four instruction generation units 52, 54, 57, and 58 in the order that a subroutine call stack reserve instruction "call–", an instruction "st" or "st–" for saving the return register, an instruction "stm" for saving nondestructive registers, an instruction "sub" for reserving a stack for a local area, an instruction "add" for releasing a stack for general instructions and a local area, an instruction "ldm" or "ldm+" for restoring nondestructive registers, an instruction "ld" for restoring a return register, and a subroutine return stack release instruction "rts+". The code output unit 59 outputs the rearranged machine instructions.

Figure 35:
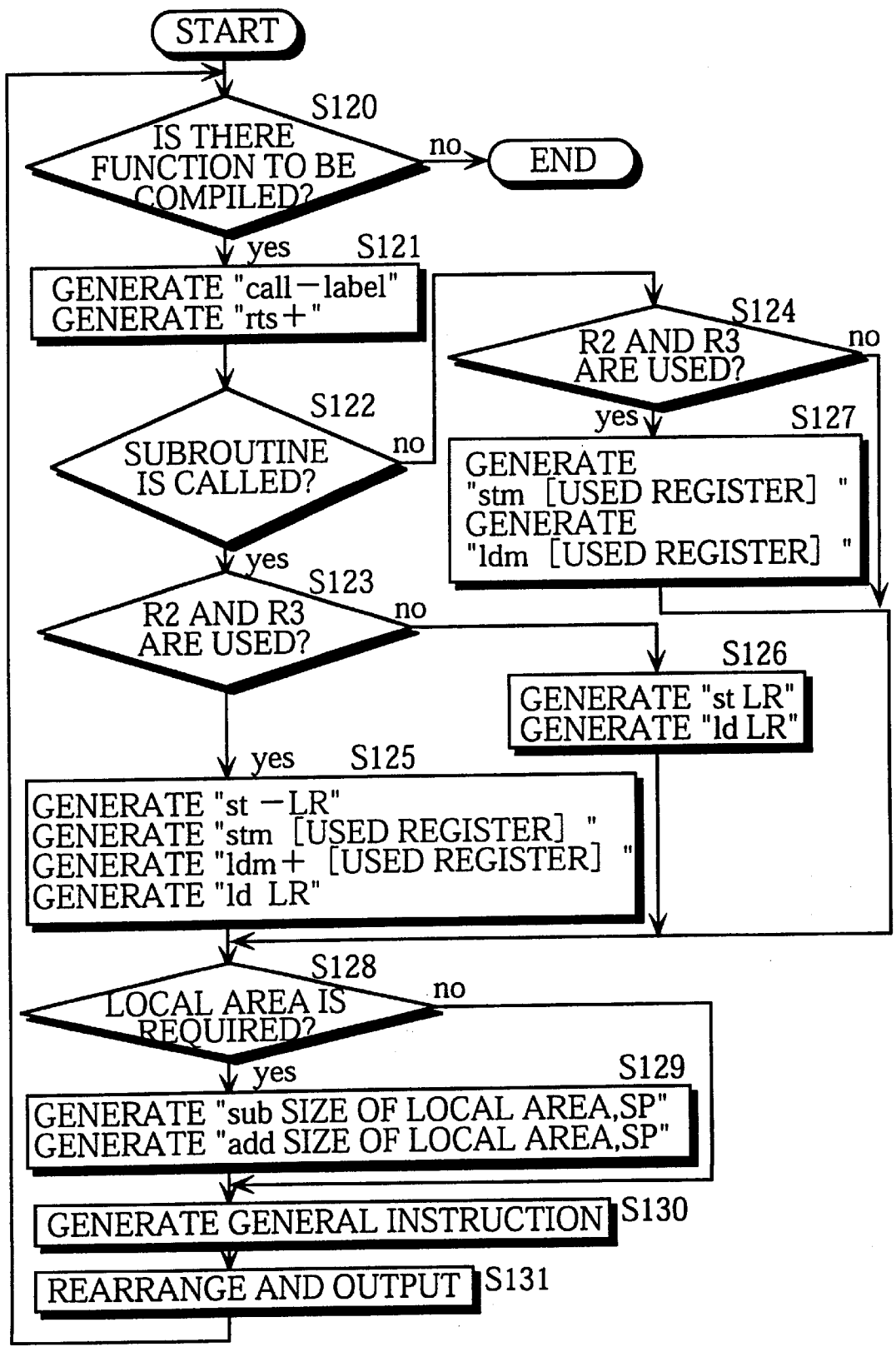
FIG. 35 is a flowchart showing the operation procedure of the compiler of the modification.

FIG. 35 is a flowchart showing characteristic operations of the compiler of this modification. This flowchart differs from that of the compiler 50 shown in FIG. 9 as to the machine instruction set which is generated (step S125) when a target function calls a subroutine (step S122) and the target function uses nondestructive registers (step S123).

Figure 37:
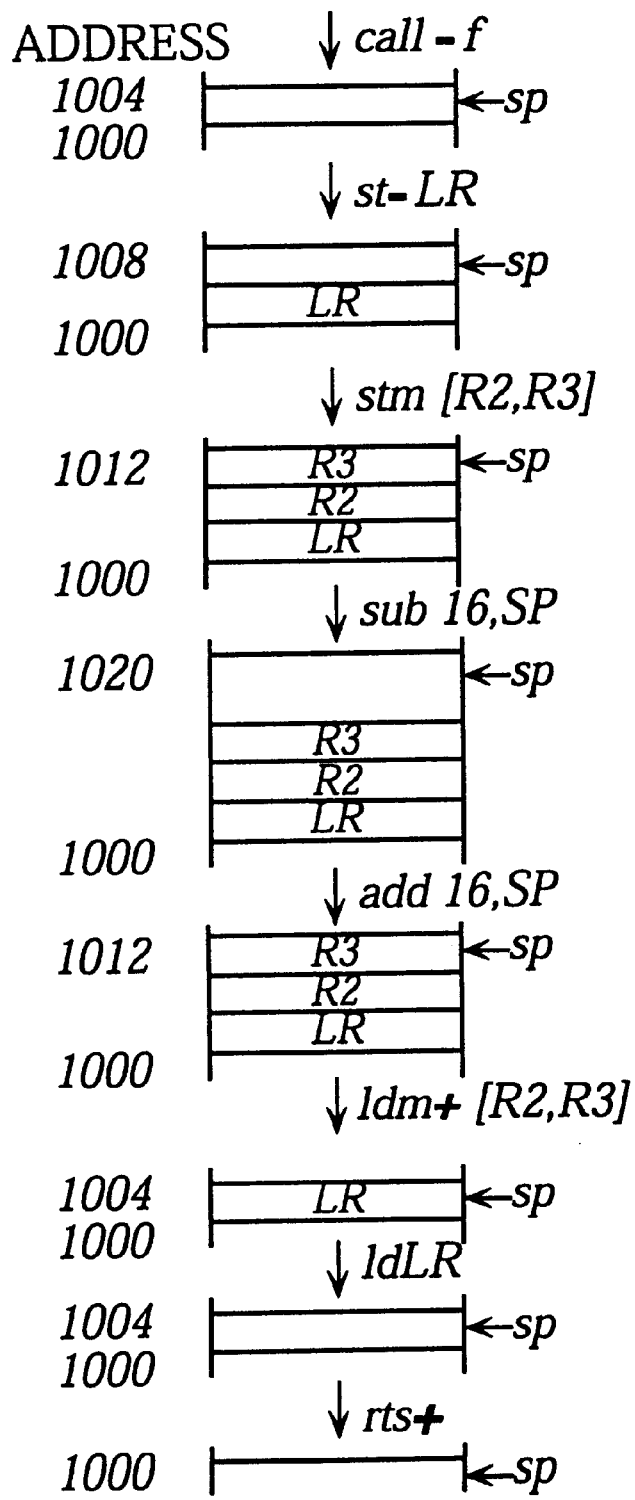
FIG. 37 shows changes in the stack contents, the stack size, and the value of the SP when the processor of the present invention executes the machine program shown in FIG. 36.
Figure 38A:
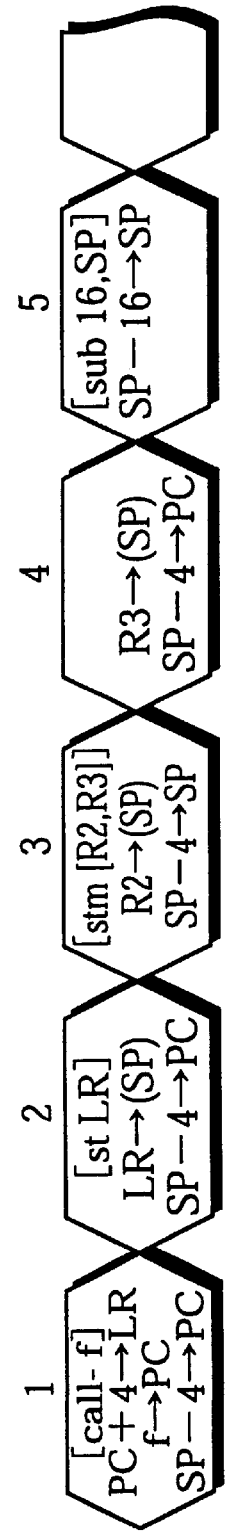
FIGS. 38A and 38B are timing charts showing the operation of the processor of the present invention in each cycle in respectively the former half and the latter half of the machine instructions shown in FIG. 36.
Figure 38B:
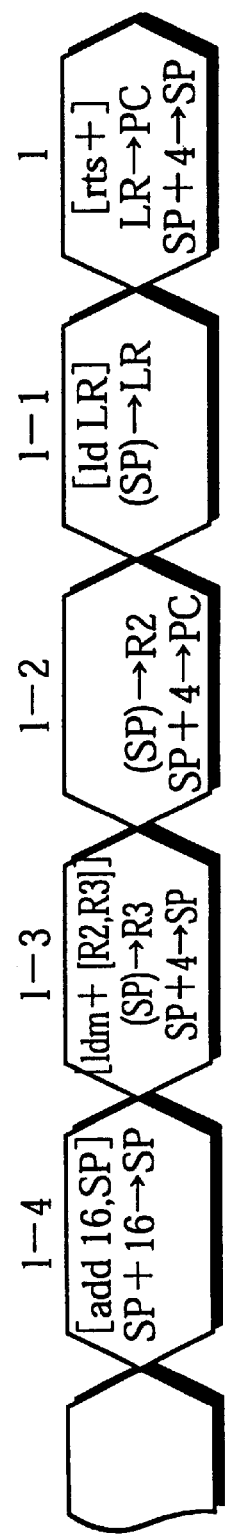

FIG. 36 is a list of the machine program 41 generated from the source program 40 shown in FIG. 10 by the compiler of this modification and corresponds to FIG. 11 of the compiler 50. FIG. 37 shows changes in the stack contents, the stack size, and the value of the SP 12 when the processor 10 executes the machine program 41 shown in FIG. 36. FIGS. 38A and 38B are timing charts which show the operation of the processor 10 in each cycle in respectively the former half (steps S221–S224) and the latter half (steps S226–S229) of the machine instructions shown in FIG. 36.

As can be seen by comparing FIGS. 38A and 38B with FIGS. 13A and 13B, the compiler of this modification generates different machine instructions to the compiler 50. However, the number of cycles required to execute the generated machine instructions does not change. That is, the compiler of this modification generates machine program where the execution time for calling a subroutine and that for returning from the subroutine are each shortened by three cycles, in comparison with a conventional compiler.

Figure 40:
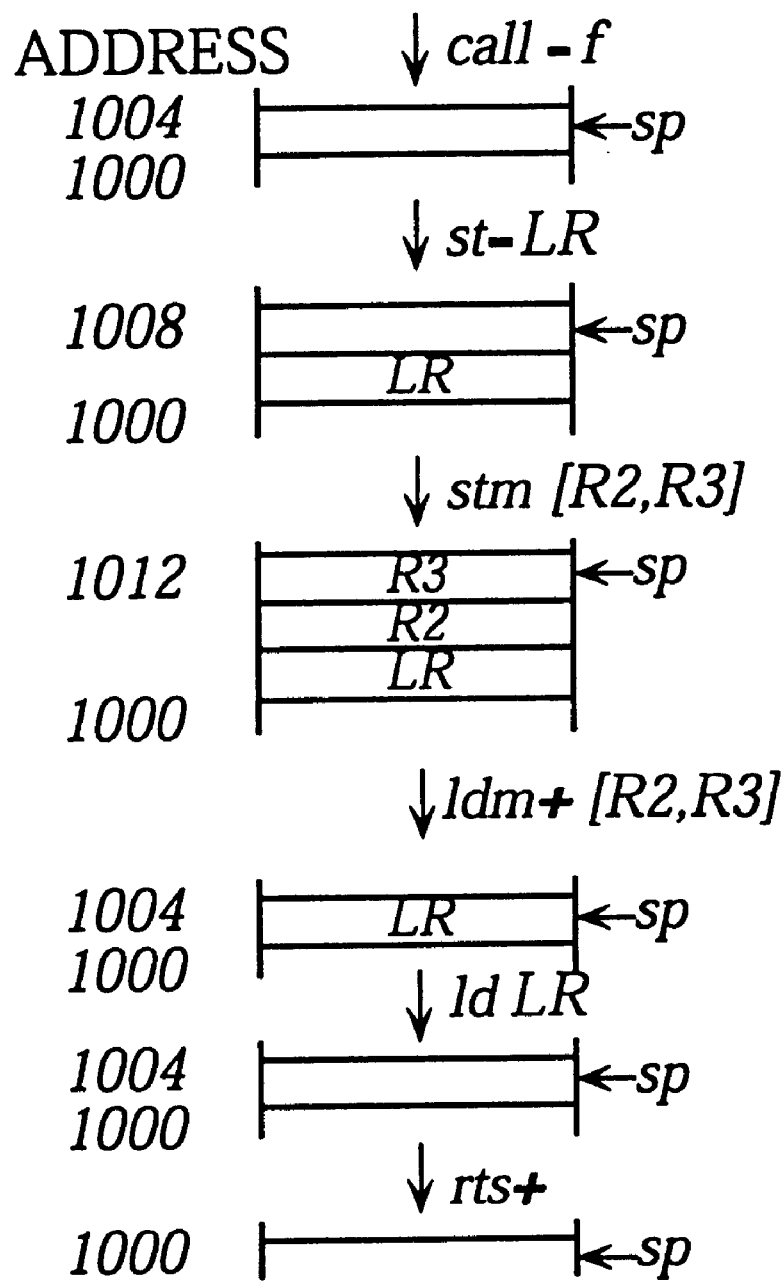
FIG. 40 shows changes in the stack contents, the stack size, and the value of the SP when the processor of the present invention executes the machine program shown in FIG. 39.

FIG. 39 is a list of the machine program 41 generated from the source program shown in FIG. 17 by the compiler of this modification and corresponds to FIG. 18 of the compiler 50. FIG. 40 shows changes in the stack contents, the stack size, and the value of the SP 12 when the processor 10 executes the machine program 41 shown in FIG. 39.

The machine program 41 shown in FIG. 39 includes machine instructions unique to the processor 10 (the former half of the machine program 41 where the function "f" is called includes the subroutine call stack reserve instruction "call–", the multiple register store stack reserve instruction "st–", and the multiple register store instruction "stm", and the latter half includes the multiple register load stack reserve instruction "ldm+" and the subroutine return stack release instruction "rts+"). Therefore, when the processor 10 executes the machine program 41, the execution time for calling the function "f" and that for returning from the function "f" are each shortened by three cycles, in comparison with the case of a conventional processor.

As described above, with the processor 10 and the compiler 50 of the present embodiment and with the compiler of the present modification, each routine operation for reserving a stack associated with a subroutine call is performed in parallel with one register save, and each routine operation for releasing a stack associated with a subroutine return is performed in parallel with one register restoration and the subroutine return. As a result, execution time for reserving and releasing a stack seems to be unnecessary and execution time for calling a subroutine and for returning from the subroutine are shortened. This improvement in the execution speed becomes more pronounced as the number of subroutines included in a machine program increases and as the number of registers which should be saved when subroutines are called increases.

The processor and compiler of the present invention have been described above by means of the embodiment and the modification, although it should be obvious that the present invention is not limited to the examples described above. For instance, the processor 10 of the embodiment includes the specialized register LR 13 for holding a return address and executes specialized instructions for using the LR13. However, the present invention is not required to use the LR 13 and the specialized instructions. The processor may always store a return address on a stack, instead of in the processor itself. The LR 13 is a nondestructive register in a sense and therefore can be used in the same way as the GR 11 during saving and restoring processes.

Also, in the embodiment, the nondestructive register use judgement unit 56 of the compiler 50 judges whether nondestructive registers are used according to whether there is an arithmetic logic operation expression whose right side includes three or more variables. However, the nondestructive register use judgement unit 56 may judge the use of nondestructive registers according to the result of the resource allocation by the preprocessing unit 51 (whether the number of necessary registers exceeds two).

Furthermore, the compiler 50 of the embodiment and the compiler of the modification are achieved by programs executed by general computer systems. Therefore, these compilers may be distributed using recording and transmission media, such as CD-ROMs and telecommunication lines.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A microprocessor which is connected to a data memory providing a stack area and to an instruction memory pre-storing instructions, comprising:

a subroutine call means for causing a branch to a subroutine in an execution sequence;

a stack reserve means for reserving a new stack area in the data memory by updating a stack pointer using a fixed value;

an instruction fetch means for fetching an instruction from the instruction memory;

a first instruction execution means for having, when the fetched instruction is a first instruction, the subroutine call means cause the branch and the stack reserve means reserve the new stack area in parallel; and a post-branch data save means for having, after the branch by the subroutine call means, the stack reserve means reserve another new stack area in parallel with a saving of data into the previously reserved new stack area.

2. The microprocessor of claim 1, further comprising:

a return address storage means which includes an area for storing a return address, the return address being a return destination when the execution sequence is returned from the subroutine to a main routine that called the subroutine; and a return address writing means for writing the return address in the return address storage means, wherein when the fetched instruction is the first instruction, the first instruction execution means has the return address writing means write the return address in the return address storage means in parallel with the subroutine call means causing the branch and the stack reserve means reserving the new stack area.

3. The microprocessor of claim 2, further comprising a return address save means for saving the return address stored in the return address storage means into the new stack area.

4. The microprocessor of claim 3, further comprising a second instruction execution means for having, when the fetched instruction is a second instruction, the return address save means save the return address stored in the return address storage means into the new stack area and the stack reserve means reserve another new stack area in parallel.

5. The microprocessor of claim 3, further comprising a return address restoration means for restoring the return address saved in the new stack area into the return address storage means.

6. The processor of claim 5, further comprising:

a stack release means for releasing the new stack area in the data memory after the return address restoration means has restored the return address into the return address storage means; and a third instruction execution means for having, when the fetched instruction is a third instruction, the return address restoration means restore the return address saved in the new stack area into the return address storage means and the stack release means release the new stack area in parallel.

7. The microprocessor of claim 1, further comprising:

a subroutine return means for causing a return from the subroutine to the main routine in the execution sequence;

a stack release means for releasing the new stack area in the data memory; and a fourth instruction execution means for having, when the fetched instruction is a fourth instruction, the subroutine return means cause the return and the stack release means release the new stack area in parallel.

8. The microprocessor of claim 7, further comprising a return address storage means for storing a return address, the return address being a return destination when the execution sequence is returned from the subroutine to a main routine that called the subroutine, wherein the subroutine return means has the execution sequence return to a position of the main routine specified by the return address stored in the return address storage means.

9. The microprocessor of claim 1, further comprising:

a data storage means for storing data to be saved;

a data save means for saving the data stored in the data storage means into the new stack area; and a fifth instruction execution means for having the data save means save the data stored in the data storage means into the new stack area and the stack reserve means reserve another new stack area in parallel.

10. The microprocessor of claim 9, wherein the data storage means stores a plurality of pieces of data to be saved, and the fifth instruction execution means has the data save means save the data stored in the data storage means into the new stack area and the stack reserve means reserve another new stack area in parallel repeatedly for each of the plurality of pieces of data.

11. The microprocessor of claim 1, further comprising:

a data storage means which includes an area for storing data;

a data restoration means for restoring data in a stack area in the data memory into the data storage means;

a stack release means for releasing the stack area that stored the data restored into the data storage means by the data restoration means; and a sixth instruction execution means for having, when the fetched instruction is a sixth instruction, the data restoration means restore the data in the stack area into the data storage means and the stack release means release the stack area that stored the restored data in parallel.

12. The microprocessor of claim 11, wherein the data storage means includes a plurality of storage areas for storing a plurality of pieces of data, and the sixth instruction execution means has the data restoration means restore the data in the stack area into the data storage means and the stack release means release the stack area that stored the restored data in parallel repeatedly for each of the plurality of storage areas of the data storage means.

13. A microprocessor which is connected to a data memory providing a stack area and to an instruction memory prestoring instructions, comprising:

a program counter for storing an address of a storage area in the instruction memory;

a stack pointer for storing an address of a storage area in the data memory;

a subroutine call means for storing an entry address of a subroutine into the program counter;

a stack reserve means for decrementing the address stored in the stack pointer by one storage area;

an instruction fetch means for fetching an instruction stored in a storage area specified by the address stored in the program counter from the instruction memory;

a subroutine call instruction execution means for having, when the fetched instruction is a subroutine call instruction including the entry address, the subroutine call means store the entry address into the program counter and the stack reserve means decrement the address stored in the stack pointer by one storage area in parallel; and a post-branch data save means for having after the storing of the entry address by the subroutine call means, the stack reserve means decrement the address stored in the stack pointer by one storage area again in parallel with a saving of data into a storage area specified by the previous address in the stack pointer.

14. The microprocessor of claim 13, further comprising:

a return address register which includes an area for storing a return address, the return address being a return destination when an execution sequence is returned from the subroutine to a main routine that called the subroutine; and a return address writing means for writing the return address in the return address register, wherein when the fetched instruction is the subroutine call instruction, the subroutine call instruction execution means has the return address writing means write the return address in the return address register in parallel with the subroutine call means storing the entry address into the program counter and the stack reserve means decrementing the address stored in the stack pointer by one storage area.

15. The microprocessor of claim 14, further comprising a return address save means for pushing the return address stored in the return address register onto a storage area in the data memory specified by the address stored in the stack pointer.

16. The microprocessor of claim 15, further comprising a return address save instruction execution means for having, when the fetched instruction is a return address save instruction, the return address save means push the return address stored in the return address register onto the specified storage area and the stack reserve means decrement the address stored in the stack pointer by one storage area in parallel.

17. The microprocessor of claim 15, further comprising a return address restoration means for popping the return address from the specified storage area into the return address register.

18. The microprocessor of claim 17, further comprising:

a stack release means for incrementing the address stored in the stack pointer by one storage area; and a return address restoration instruction execution means for having, when the fetched instruction is a return address restoration instruction, the return address restoration means pop the return address from the specified storage area into the return address register and the stack release means increment the address stored in the stack pointer by one storage area in parallel.

19. The microprocessor of claim 13, further comprising:

a subroutine return means for storing a return address in the program counter, the return address being a return destination when an execution sequence is returned from the subroutine to a main routine that called the subroutine;

a stack release means for incrementing the address stored in the stack pointer by one storage area; and a subroutine return instruction execution means for having, when the fetched instruction is a subroutine return instruction, the subroutine return means store the return address in the program counter and the stack release means increment the address by one storage area in parallel.

20. The microprocessor of claim 19, further comprising a return address register for storing the return address, wherein the subroutine return means writes the return address stored in the return address register in the program counter.

21. The microprocessor of claim 13, further comprising:

a data storage means for storing data to be saved;

a data save means for pushing the data stored in the data storage means onto a storage area specified by the address stored in the stack pointer; and a data save instruction execution means for having, when the fetched instruction is a data save instruction, the data save means push the data stored in the data storage means onto the specified storage area and the stack reserve means decrement the address stored in the stack pointer by one storage area in parallel.

22. The microprocessor of claim 21, wherein the data storage means stores a plurality of pieces of data to be saved, and the data save instruction execution means has the data save means push the data stored in the data storage means onto the specified storage area and the stack reserve means decrementing the address stored in the stack pointer by one storage area in parallel repeatedly for each of the plurality of pieces of data.

23. The microprocessor of claim 13, further comprising;

a data storage means which includes an area for storing data;

a data restoration means for popping data from a storage area specified by the address stored in the stack pointer into the data storage means;

a stack release means for incrementing the address stored in the stack pointer by one storage area; and a data restoration instruction execution means for having, when the fetched instruction is a data restoration instruction, the data restoration means pop the data from the specified storage area into the data storage means and the stack release means increment the address stored in the stack pointer by one storage area in parallel.

24. The microprocessor of claim 23, wherein the data storage means includes a plurality of storage areas for storing a plurality of pieces of data, and the data restoration instruction execution means has the data restoration means pop the data from the specified storage area into the data storage means and the stack release means increment the address stored in the stack pointer by one storage area in parallel repeatedly for each of the plurality of storage areas of the data storage means.

25. A compiler for converting a source program into machine instructions, comprising a subroutine call stack reserve instruction generation means for generating a subroutine call stack reserve instruction when a subroutine call instruction is detected in the source program, wherein the subroutine call stack reserve instruction is a machine instruction for having a microprocessor perform the following operations (a) and (b) in parallel, (a) a causing of a branch to a subroutine in an execution sequence, and (b) a reserving of a new stack area in a data memory; and a post-branch data save instruction generation means for generating a post-branch data save instruction as an instruction constituting the subroutine, wherein the post-branch data save instruction is a machine instruction for having the microprocessor perform the following operations (c) and (d) in parallel, (c) a saving of data, which should be saved, into the new stack area in the data memory, and (d) a reserving of another new stack area in the data memory for latter use.

26. The compiler of claim 25, wherein the subroutine call stack reserve instruction is a machine instruction for having the microprocessor further perform the following operation (c) in parallel with the operations (a) and (b):

(c) a writing of a return address in a return address storage means of the microprocessor, the return address being a return destination when the execution sequence is returned from the subroutine to a main routine that called the subroutine.

27. The compiler of claim 26, further comprising a return address save instruction generation means for generating a return address save instruction when a subroutine call instruction is detected in the subroutine, wherein the return address save instruction is a machine instruction for having the microprocessor perform the following operation (d):

(d) a saving of the return address stored in the return address storage means into the new stack area.

28. The compiler of claim 27, wherein the return address save instruction is a machine instruction for having the microprocessor further perform the following operation (e) in parallel with the operation (d):

(e) a reserving of another new stack area in the data memory.

29. The compiler of claim 27, further comprising a return address restoration instruction generation means for generating a return address restoration instruction when a subroutine call instruction is detected in the subroutine, wherein the return address restoration instruction is a machine instruction for having the microprocessor perform the following operation (f):

(f) a restoration of the return address saved in the new stack area into the return address storage means.

30. The compiler of claim 29, wherein the return address restoration instruction is a machine instruction for having the microprocessor further perform the following operation (g) in parallel with the operation (f):

(g) a release of the new stack area in the data memory.

31. The compiler of claim 25, further comprising:

a subroutine return stack release instruction generation means for generating a subroutine return stack release instruction, wherein the subroutine return stack release instruction is a machine instruction for having the microprocessor perform the following operations (h) and (i) in parallel:

(h) a causing of a return from the subroutine to a main routine that called the subroutine in the execution sequence; and (i) a release of the new stack area in the data memory.

32. The compiler of claim 31, wherein the subroutine return stack reserve instruction is a machine instruction for causing a return to a position of the main routine specified by a return address stored in a return address storage means in the execution sequence.

33. The compiler of claim 25, further comprising:

a data save judging means for judging whether the microprocessor stores a piece of data which should be saved before a branch to the subroutine is caused in the execution sequence; and a data save stack reserve instruction generation means for generating a data save stack reserve instruction when a judging result of the data save judging means is affirmative, wherein the data save stack reserve instruction is a machine instruction for having the microprocessor perform the following operations (j) and (k) in parallel:

(j) a saving of the piece of data judged to be saved into the new stack area; and (k) a reserving of another new stack area in the data memory.

34. The compiler of claim 33, wherein the data save stack reserve instruction is a machine instruction for having the microprocessor repeatedly perform the operations (j) and (k).

35. The compiler of claim 25, further comprising:

a data restoration stack release instruction generation means for generating a data restoration stack release instruction, wherein the data restoration stack release instruction is a machine instruction for having the microprocessor perform the following operations (l) and (m) in parallel:

(l) a restoration of data stored in a stack area in the data memory into a data storage means of the microprocessor; and (m) a release of the stack area that stored the restored data in the data memory.

36. The compiler of claim 35, wherein the data restoration stack release instruction is a machine instruction for having the microprocessor repeatedly perform the operations (l) and (m).

37. A recording medium for recording machine instruction sequence which is executed by a microprocessor, wherein the machine instruction sequence includes a subroutine call stack reserve instruction and a post-branch data save instruction, wherein the subroutine call stack reserve instruction is a machine instruction for having the microprocessor perform the following operations (a) and (b) in parallel, (a) a causing of a branch to a subroutine in an execution sequence, and (b) a reserving of a new stack area in a data memory, and the post-branch data save instruction is an instruction constituting the subroutine and a machine instruction for having the microprocessor perform the following operations (c) and (d) in parallel, (c) a saving of data, which should be saved, into the new stack area in the data memory, and (d) a reserving of another new stack area in the data memory for latter use.

38. The recording medium of claim 37, wherein the subroutine call stack reserve instruction is a machine instruction for having the microprocessor further perform the following operation (c) in parallel with the operations (a) and (b):

(c) a writing of a return address in a return address storage means of the microprocessor, the return address being a return destination when the execution sequence is returned from the subroutine to a main routine that called the subroutine.

39. The recording medium of claim 38, wherein the machine instruction sequence further includes a return address save instruction, the return address save instruction being a machine instruction for having the microprocessor perform the following operation (d):

(d) a saving of the return address stored in the return address storage means into the new stack area.

40. The recording medium of claim 39, wherein the return address save instruction is a machine instruction for having the microprocessor further perform the following operation (e) in parallel with the operation (d):

(e) a reserving of another new stack area in the data memory.

41. The recording medium of claim 39, wherein the machine instruction sequence further includes a return address restoration instruction, the return address restoration instruction being a machine instruction for having the microprocessor perform the following operation (f):

(f) a restoration of the return address saved in the new stack area into the return address storage means.

42. The recording medium of claim 41, wherein the return address restoration instruction is a machine instruction for having the microprocessor further perform the following operation (g) in parallel with the operation (f):

(g) a release of the new stack area in the data memory.

43. The recording medium of claim 37, wherein the machine instruction sequence further includes a subroutine return stack release instruction, the subroutine return stack release instruction being a machine instruction for having the microprocessor perform the following operations (h) and (i) in parallel:

(h) a causing of a return from the subroutine to a main routine that called the subroutine in the execution sequence; and (i) a release of the new stack area in the data memory.

44. The recording medium of claim 43, wherein the subroutine return stack reserve instruction is a machine instruction for causing a return to a position of the main routine specified by a return address stored in a return address storage means in the execution sequence.

45. The recording medium of claim 37, wherein the machine instruction sequence further includes a data save stack reserve instruction, the data save stack reserve instruction being a machine instruction for having the microprocessor perform the following operations (j) and (k) in parallel:

(j) a saving of data to be saved into the new stack area before a branch to the subroutine is caused in the execution sequence; and (k) a reserving of another new stack area in the data memory.

46. The recording medium of claim 45, wherein the data save stack reserve instruction is a machine instruction for having the microprocessor repeatedly perform the operations (j) and (k).

47. The recording medium of claim 37, wherein the machine instruction sequence further includes a data restoration stack release instruction, the data restoration stack release instruction being a machine instruction for having the microprocessor perform the following operations (l) and (m) in parallel:

(l) a restoration of data stored in a stack area in the data memory into a data storage means of the microprocessor; and (m) a release of the stack area that stored the restored data in the data memory.

48. The recording medium of claim 47, wherein the data restoration stack release instruction is a machine instruction for having the microprocessor repeatedly perform the operations (l) and (m).

* * * * *